(12) United States Patent
Okuno et al.

(10) Patent No.: US 10,263,235 B2
(45) Date of Patent: Apr. 16, 2019

(54) SEPARATOR, NONAQUEOUS ELECTROLYTE BATTERY, BATTERY PACK, ELECTRONIC DEVICE, ELECTRIC VEHICLE, POWER STORAGE DEVICE, AND POWER SYSTEM

(71) Applicant: Sony Corporation, Tokyo (JP)

(72) Inventors: Moriaki Okuno, Kanagawa (JP); Toshitsugu Ono, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 226 days.

(21) Appl. No.: 14/371,630

(22) PCT Filed: Dec. 4, 2012

(86) PCT No.: PCT/JP2012/081867
§ 371 (c)(1),
(2) Date: Jul. 10, 2014

(87) PCT Pub. No.: WO2013/108511
PCT Pub. Date: Jul. 25, 2013

(65) Prior Publication Data
US 2015/0004464 A1    Jan. 1, 2015

(30) Foreign Application Priority Data
Jan. 19, 2012    (JP) .................... 2012-008887

(51) Int. Cl.
*H01M 2/18*    (2006.01)
*H01M 10/052*    (2010.01)
(Continued)

(52) U.S. Cl.
CPC ........... *H01M 2/18* (2013.01); *H01M 2/1686* (2013.01); *H01M 4/387* (2013.01);
(Continued)

(58) Field of Classification Search
CPC .......... H01M 10/052; H01M 10/0525; H01M 10/0587; H01M 2220/10; H01M 2220/20;
(Continued)

(56) References Cited

U.S. PATENT DOCUMENTS

2005/0196677 A1* 9/2005 Lee ................... H01M 2/145
                                                               429/309
2005/0266305 A1   12/2005 Ohata et al.
(Continued)

FOREIGN PATENT DOCUMENTS

JP    2003-157888    5/2003
JP    2005-196999    7/2005
(Continued)

OTHER PUBLICATIONS

Office Action received in CN Application 201280066904.3, dated Feb. 19, 2016, 16 pages.
(Continued)

*Primary Examiner* — Lingwen R Zeng
(74) *Attorney, Agent, or Firm* — K&L Gates LLP

(57) ABSTRACT

A separator includes a substrate layer that is porous, and a surface layer that is provided on at least one main face of the substrate layer and that has an uneven shape. The surface layer includes first particles that are for forming convexities of the uneven shape and that are a main component of the convexities, second particles that have a smaller average particle size than the first particles, cover at least a part of a surface of the first particles, and cover at least a part of a surface of the substrate layer that is exposed between the first particles, and a resin material.

31 Claims, 16 Drawing Sheets

(51) Int. Cl.
*H01M 2/16* (2006.01)
*H01M 10/0525* (2010.01)
*H01M 4/38* (2006.01)
*H01M 10/0587* (2010.01)
*H01M 2/14* (2006.01)

(52) U.S. Cl.
CPC ........ *H01M 10/0525* (2013.01); *H01M 2/145* (2013.01); *H01M 10/052* (2013.01); *H01M 10/0587* (2013.01); *H01M 2220/10* (2013.01); *H01M 2220/20* (2013.01); *Y02E 60/122* (2013.01); *Y02T 10/7011* (2013.01)

(58) Field of Classification Search
CPC ...... H01M 2/145; H01M 2/1686; H01M 2/18; H01M 4/387; Y02E 60/122; Y02T 10/7011
See application file for complete search history.

(56) References Cited

U.S. PATENT DOCUMENTS

| | | | | |
|---|---|---|---|---|
| 2006/0257728 | A1* | 11/2006 | Mortensen | H01M 2/1653 429/144 |
| 2007/0111102 | A1* | 5/2007 | Inoue | H01M 4/362 429/232 |
| 2008/0245735 | A1 | 10/2008 | Hennige et al. | |
| 2010/0129720 | A1 | 5/2010 | Sako et al. | |
| 2010/0178544 | A1* | 7/2010 | Nishikawa | B01D 67/0011 429/129 |
| 2012/0231323 | A1* | 9/2012 | Takagi | B32B 5/18 429/144 |
| 2012/0276455 | A1* | 11/2012 | Nishimura | H01M 4/621 429/232 |
| 2013/0084503 | A1* | 4/2013 | Ueki | H01M 2/1646 429/232 |

FOREIGN PATENT DOCUMENTS

| | | |
|---|---|---|
| JP | 2007-508669 | 4/2007 |
| JP | 2007508669 | 4/2007 |
| JP | 2009-231281 | 10/2009 |
| JP | 2010-056036 | 3/2010 |
| JP | 2010-123383 | 6/2010 |
| JP | 2012-190547 | 10/2012 |
| KR | 10-2006-0122953 | 11/2006 |
| KR | 10-2007-0019956 | 2/2007 |
| WO | 2005/117169 | 12/2005 |
| WO | 08/053898 | 5/2008 |
| WO | 2011158335 | 12/2011 |

OTHER PUBLICATIONS

Office Action received in JP Application 2013554206, dated Mar. 8, 2016, 3 pages.
Sheng Shui Zhang, Journal of Power Sources, A Review on the Separators of Liquid Electrolyte Li-ion Batteries. 164 (2007) 351-364.
International Search Report issued in connection with International Patent Application No. PCT/JP2012/081867, dated Mar. 12, 2013. (2 pages).
Korean Office Action dated Aug. 13, 2018 in corresponding Korean Application No. 519980960646.

* cited by examiner

FIG. 3
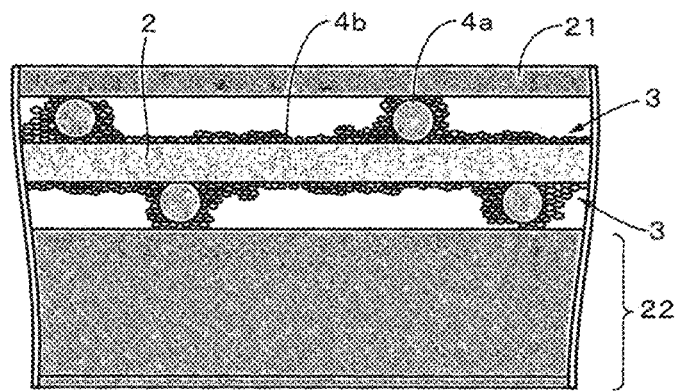
A
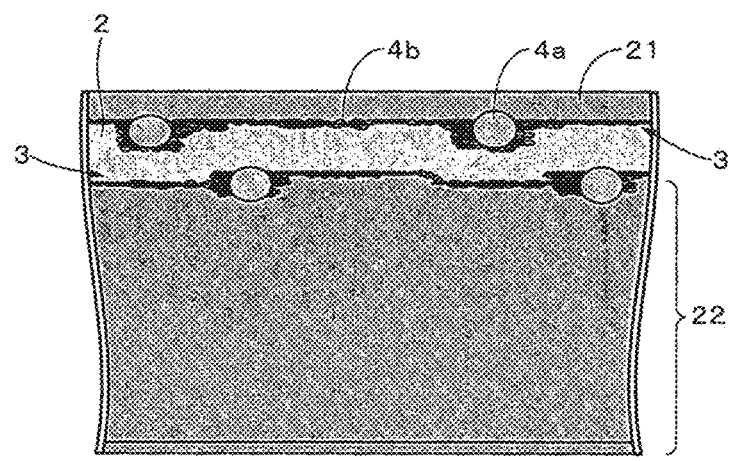
B

FIG. 9
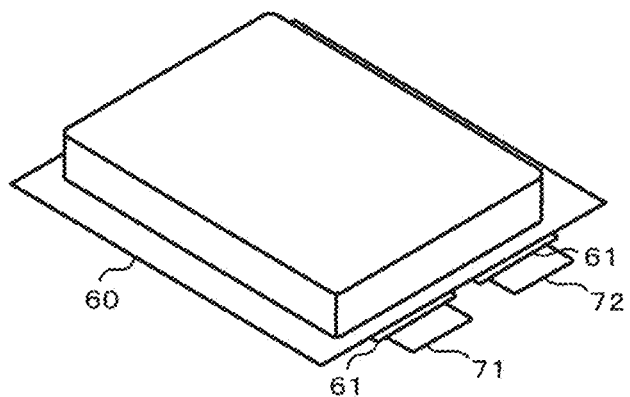
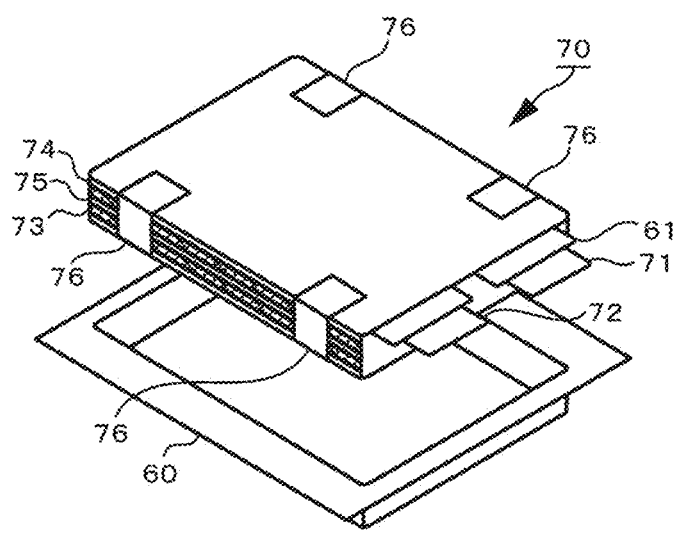
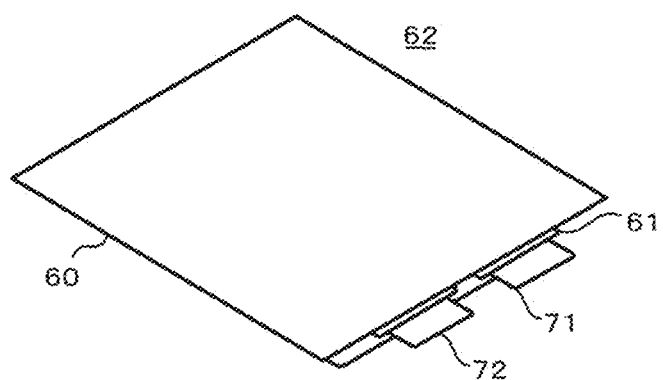

FIG. 13
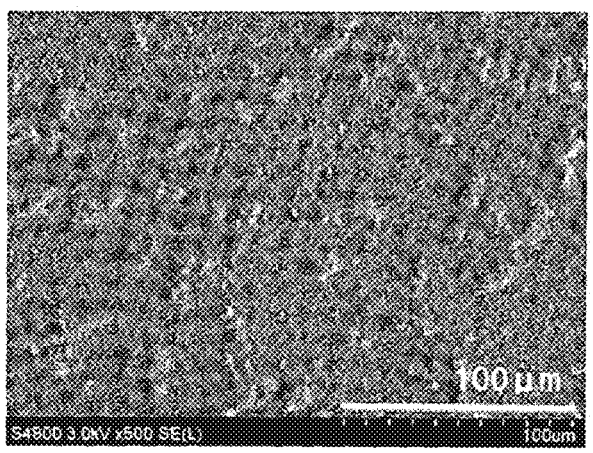
A
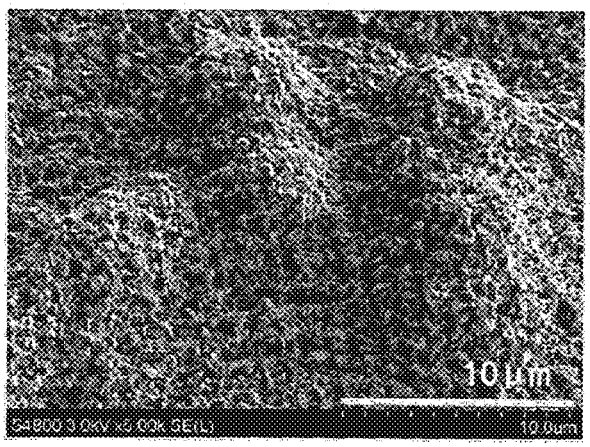
B
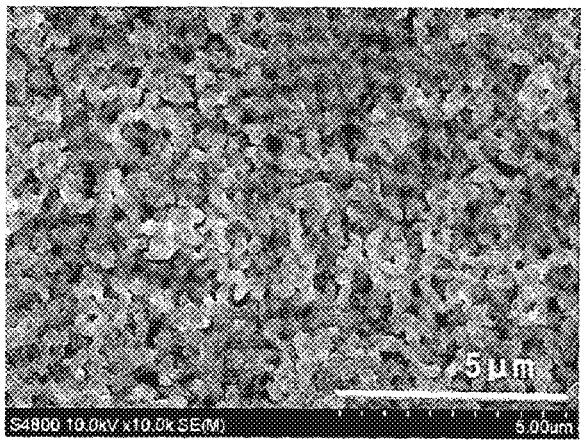
C

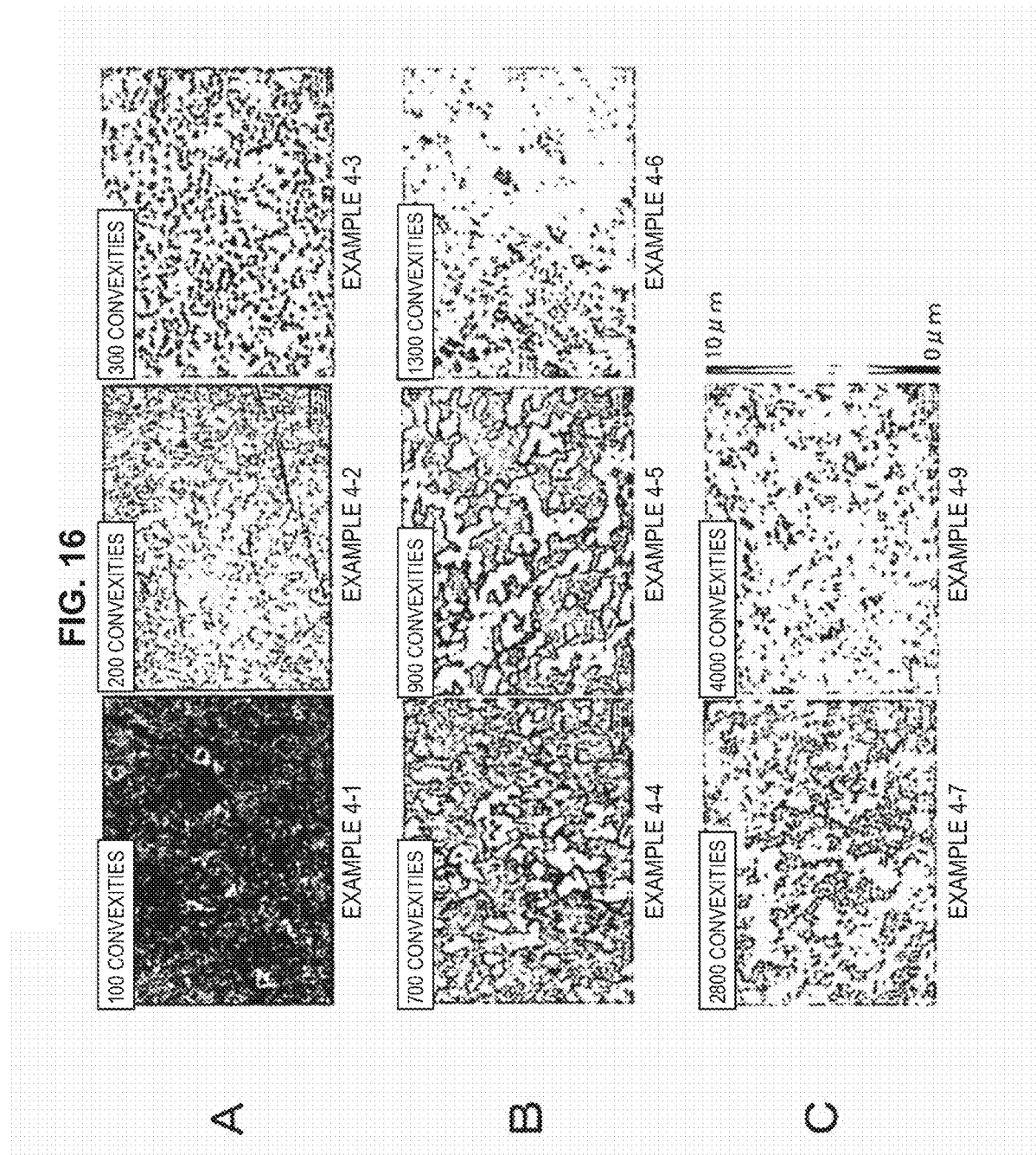

SEPARATOR, NONAQUEOUS ELECTROLYTE BATTERY, BATTERY PACK, ELECTRONIC DEVICE, ELECTRIC VEHICLE, POWER STORAGE DEVICE, AND POWER SYSTEM

CROSS REFERENCES TO RELATED APPLICATIONS

The present application is a national stage of International Application No. PCT/JP2012/081867 filed on Dec. 4, 2012 and claims priority to Japanese Patent Application No. 2012-008887 filed on Jan. 19, 2012, the disclosure of which is incorporated herein by reference.

BACKGROUND

The present technology relates to a separator. Further, the present technology relates to a nonaqueous electrolyte battery having a separator between electrodes, as well as a battery pack, an electronic device, an electric vehicle, a power storage device, and a power system that use this nonaqueous electrolyte battery.

Secondary batteries, such as lithium ion secondary batteries, are used as a power source battery in mobile devices such as a laptop computer, a vehicle power storage battery for hybrid vehicles, battery-powered vehicles and the like, as well as a power storage battery that is combined with a new energy system such as a solar cell, wind power generation and the like.

To increase the capacity of a lithium ion secondary battery even further, it has been proposed to use a material capable of forming an alloy with lithium as a negative electrode active material. For example, an alloy-based negative electrode material that includes an element having a greater theoretical capacity than a carbon material and that is capable of forming an alloy with lithium, such as silicon or tin, has been proposed as such a negative electrode active material (e.g., refer to Patent Literature 1).

Since an alloy-based negative electrode material exhibits very large expansion during charging, there is the problem that deterioration of the electrode, such as damage and fracturing of the electrode, can occur from the pressure due to expansion.

To overcome this problem, a technology has been reported in which the expansion of the alloy-based negative electrode material is absorbed by forming an uneven shape on the separator. For example, in Patent Literature 1, a technology is proposed that absorbs expansion of the negative electrode by forming an uneven shape by an embossing process on a polyolefin microporous film.

Further, in Patent Literature 2, a technology has been proposed for suppressing electrode deterioration caused by expansion and contraction of an electrode by forming voids between a polyolefin microporous film and the electrode. A technology is proposed for forming the voids between the a polyolefin microporous film and the electrode by placing a spacer between the polyolefin microporous film and the electrode, and removing the spacer later.

CITATION LIST

Patent Literature

Patent Literature 1: WO 08/053898
Patent Literature 2 JP 2003-157888A

SUMMARY

Technical Problem

However, a separator not only has to absorb expansion of the negative electrode, but also needs to have a function for increasing the safety of the battery, such as oxidation resistance and heat resistance. With a polyolefin microporous film having weak oxidation resistance and heat resistance like that in Patent Literature 1, the oxidation resistance and heat resistance is not sufficient.

Therefore, it is an object of the present invention to provide a separator and a nonaqueous electrolyte battery that can not only suppress electrode deterioration by absorbing expansion of the negative electrode, but can also improve oxidation resistance and heat resistance, as well as to provide a battery pack, an electronic device, an electric vehicle, a power storage device, and a power system that use these.

Solution to Problem

In order to solve the issues described above, the present technology provides a separator including a substrate layer that is porous, and a surface layer that is provided on at least one main face of the substrate layer and that has an uneven shape. The surface layer includes first particles that are for forming convexities of the uneven shape and that are a main component of the convexities, second particles that have a smaller average particle size than the first particles, cover at least a part of a surface of the first particles, and cover at least a part of a surface of the substrate layer that is exposed between the first particles, and a resin material.

According to the present technology, there is provided a nonaqueous electrolyte battery that includes a separator, an electrode body including a positive electrode and a negative electrode that oppose each other with the separator provided therebetween, and a nonaqueous electrolyte. The separator includes a substrate layer that is porous, and a surface layer that is provided on at least one main face of the substrate layer and that has an uneven shape. The surface layer includes first particles that are for forming convexities of the uneven shape and that are a main component of the convexities, second particles that have a smaller average particle size than the first particles, cover at least a part of a surface of the first particles, and cover at least a part of a surface of the substrate layer that is exposed between the first particles, and a resin material.

In the present technology, the battery pack, electronic device, electric vehicle, power storage device, and power system include the above-described nonaqueous electrolyte battery.

In the present technology, the surface layer of the separator includes first particles that are for forming the convexities of the uneven shape and that are a main component of the convexities, second particles that have a smaller average particle size than the first particles, cover at least a part of a surface of the first particles, and cover at least a part of a surface of the substrate layer that is exposed between the first particles, and a resin material. In the present technology, expansion of the negative electrode can be absorbed and electrode deterioration suppressed by the concavities of the uneven shape in which the first particles having a large average particle size are the main component of the convexities. In addition, the oxidation resistance and heat resistance conferred to the substrate can be further improved by covering the substrate surface with the second particles that have a small average particle size.

Advantageous Effects of Invention

According to the present invention, electrode deterioration can be suppressed by absorbing expansion of the negative electrode, and oxidation resistance and heat resistance can be improved.

Additional features and advantages are described herein, and will be apparent from the following Detailed Description and the figures.

BRIEF DESCRIPTION OF THE FIGURES

FIG. 3A is schematic diagram illustrating a configuration example of an electrode and a separator before expansion, and FIG. 3B is schematic diagram illustrating a configuration example of an electrode and a separator after expansion.

FIG. 9A is an external view of a nonaqueous electrolyte battery including a laminated electrode body housed in a package member, FIG. 9B is an exploded perspective view illustrating the laminated electrode body housed in the package member, and FIG. 9C is an external view illustrating the appearance from a bottom face side of the nonaqueous electrolyte battery illustrated in FIG. 9A.

FIG. 13A is an SEM image of a surface layer at 500 times magnification, FIG. 13B is an SEM image of a surface layer at 5,000 times magnification, and FIG. 13C is an SEM image of a surface layer at 10,000 times magnification.

FIGS. 16A to 16C illustrate the results of observing a surface layer using a laser microscope.

DETAILED DESCRIPTION

Hereinafter, preferred embodiments of the present invention will be described in detail with reference to the appended drawings. Note that, in this specification and the drawings, elements that have substantially the same function and structure are denoted with the same reference signs, and repeated explanation is omitted. Embodiments of the present technology will be described in the following order with reference to the drawings.

1. First embodiment (separator example)
2. Second embodiment (first example of a nonaqueous electrolyte battery)
3. Third embodiment (second example of a nonaqueous electrolyte battery)
4. Fourth embodiment (third example of a nonaqueous electrolyte battery)
5. Fifth embodiment (example of a battery pack using a nonaqueous electrolyte battery)
6. Sixth embodiment (example of a power storage system example etc. using a nonaqueous electrolyte battery)
7. Other embodiments (modified examples)

1. First Embodiment (Separator Structure)

Figure 1:
FIG. 1 is a cross-sectional view illustrating a configuration example of a separator according to a first embodiment of the present technology.

A configuration example of the separator according to the first embodiment of the present technology will now be described with reference to FIG. 1. FIG. 1 is a cross-sectional view illustrating a configuration example of a separator according to a first embodiment of the present technology. As illustrated in FIG. 1, the separator according to the first embodiment of the present technology includes a substrate 2 and a surface layer 3 formed on at least one of the two main faces of the substrate 2. It is noted that although the separator example illustrated in FIG. 1 is an example of a separator on which the surface layer 3 is formed on both of the main faces of the substrate 2, the separator may be formed on just one of the two main faces of the substrate 2. The separator separates a positive electrode and a negative electrode in the battery to suppress current short circuiting caused by contact between the two electrodes.

Substrate

The substrate 2 is a porous layer that is porous. More specifically, the substrate 2 is, for example, a porous film that is configured from an insulating film having a large ion permeability and predetermined mechanical strength. For example, if the separator is used in a battery such as a nonaqueous electrolyte battery, an electrolyte solution is held in the pores of the substrate 2. In addition to having a predetermined mechanical strength as a main component of the separator, it is preferred that the substrate 2 has a high resistance to the electrolyte solution, a low reactivity, and a low susceptibility to expansion.

As the resin material forming the substrate 2, it is preferred to use a polyolefin resin, such as polypropylene or polyethylene, an acrylic resin, a styrene resin, a polyester resin, or a nylon resin. It is especially preferred to use a polyolefin resin, such as a polyethylene like low density polyethylene, high density polyethylene, and linear polyethylene, or a low-molecular-weight wax component thereof, or polypropylene, because such resins have a suitable melt temperature and are easily available. Further, a structure formed by laminating two or more kinds of these porous films, or a porous film formed by melt-kneading two or more kinds of resin material, may also be used. A material including a porous film formed from a polyolefin resin has excellent separation properties between the positive electrode and the negative electrode, and can thus dramatically reduce internal short circuits.

Nonwoven cloth may be used as the substrate 2. Examples of the fibers forming nonwoven cloth that can be used include aramid fibers, glass fibers, polyolefin fibers, polyethylene terephthalate (PET) fibers, nylon fibers or the like alone or in combination of two or more kinds thereof.

The thickness of the substrate 2 can be arbitrarily set as long as it is thick enough to maintain the required strength. However, it is preferred to set the thickness so that not only can insulation between the positive electrode and the negative electrode be achieved and short circuiting and the like prevented, but also so that the substrate 2 has a level of ion permeability at which the battery reactions can be suitably carried out via the separator, and that allows the volumetric efficiency of the active material layers that participate in the battery reactions in the battery to be as high as possible. Specifically, it is preferred that the thickness of the substrate 2 is in the range of 5 μm or more to 20 μm or less.

In order to obtain the above-mentioned level of ion permeability, it is preferred that the porosity of the substrate 2 is 25% or more to 70% or less. However, if nonwoven cloth is used as the substrate 2, it is preferred that the porosity is 50% or more to 90% or less. Although ion permeability depends on the current value during actual use of the battery, properties such as the structure of the substrate 2, and the thickness, if the porosity is less than the above-described range, movement of the ions involved in charging and discharging in the electrolyte solution is hindered. Consequently, the load characteristics deteriorate, and it tends to be more difficult to extract a sufficient capacity during large current discharge. Further, if the porosity is greater than the above-described range, the separator strength deteriorates. Especially, for a separator in which the surface layer 3 is provided on the surface like in the present technology, it is common to design so that the thickness of the substrate 2 is made thinner based on the thickness of the surface layer 3, so that the separator as a whole has a thickness equal to a monolayer separator. Consequently, the strength of the separator largely depends on the strength of the substrate 2, which means that it is preferred for the substrate 2 to have a strength that is equal to or greater than a predetermined level.

Surface Layer

Figure 2:
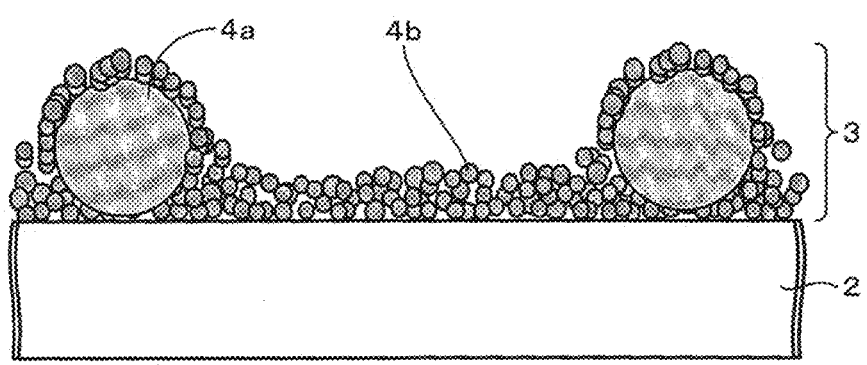
FIG. 2 is an expanded cross-sectional view schematically illustrating a cross-section of a surface layer.

FIG. 2 is an expanded cross-sectional view schematically illustrating a cross-section of the surface layer. As illustrated in FIG. 2, the surface layer 3 is formed on the substrate 2, and has an uneven shape having convexities and concavities. This surface layer 3 is porous. More specifically, since the surface layer 3 has, for example, an ion permeation function, an electrolyte solution retention function and the like as the separator, multiple tiny voids are formed over the whole surface layer 3. If this separator is used in a battery such as a nonaqueous electrolyte battery, the electrolyte solution is held in the pores (voids) of the surface layer 3. Further, if this separator is used in a battery, the convexities of the surface layer 3 abut an electrode (not illustrated) opposing the surface layer 3, and a space corresponding to the concavities is formed between the electrode and the separator. Specifically, for example, if the surface layer 3 is formed on both faces of the substrate 2, the convexities of the surface layer 3 formed on one of the main faces abut the opposing negative electrode (not illustrated), and a space corresponding to the concavities is formed between the negative electrode and the separator. Further, the convexities of the surface layer 3 formed on the other main face abut the opposing positive electrode (not illustrated), and a space corresponding to the concavities is formed between the positive electrode and the separator. For example, the space corresponding to the concavities formed on the negative electrode side are formed for the purpose of absorbing expansion in the volume of the negative electrode. Consequently, the expansion pressure acting on the electrodes due to the expansion of the negative electrode can be decreased, which allows damage and fracturing of the electrodes to be prevented. Although it is not essential for the positive electrode side to have an uneven shape as long as oxidation resistance and heat resistance can be conferred to the substrate, as illustrated in FIG. 3B, since the uneven shape of the positive electrode side also contributes to absorption of the expansion in volume of the negative electrode, expansion of the negative electrode can be absorbed more effectively without having to use the excessively large first particles 4a on the negative electrode side.

The surface layer 3 includes first particles 4a for forming the convexities of the uneven shape, and second particles 4b that have a smaller average particle size than the first particles 4a, cover at least a part of the surface of the first particles 4a, and cover at least a part of the surface of the substrate 2 that is exposed between the first particles. The first particles 4a and the second particles 4b are electrically insulating particles that are both either inorganic particles or organic particles, for example. The average particle size represents the average particle diameter (D50) of a cumulative total of 50% by volume calculated from the side having the smaller particle size in a particle size distribution measured by a laser refraction method. For example, the average particle diameter (D50) can be measured using a laser refraction-type particle size distribution measuring apparatus ("SALD 7100", manufactured by Shimadzu Corporation).

Although not illustrated, the surface layer 3 contains a resin material for binding the particles to the surface of the substrate 2 and binding the particles together. This resin material may have, for example, a three-dimensional network structure obtained by fibrilizing, in which the fibrils are continuously linked to each other. By supporting the particles on such a resin material having a three-dimensional network structure, the particles can maintain a dispersed state without being connected to each other. Further, the resin material may bind to the surface of the substrate 2 or bind the particles together without being fibrilized.

The surface layer 3 containing the first particles 4a, the second particles 4b, and the resin material can confer oxidation resistance, heat resistance, and mechanical strength to the substrate 2. Although described in more detail below, the first particles 4a have a function for forming the convexities of the uneven shape, and the second particles 4b have a function for further increasing the oxidation resistance, heat resistance, and mechanical strength conferred to the substrate 2 and a function for preventing the first particles 4a from dropping out. It is noted that in the following, of the surface layer 3, the portion formed by the second particles 4b that cover the surface of the substrate 2 between the first particles 4a and the resin material is referred to as the surface layer 3 formed by the second particles 4b covering the surface of the substrate 2 (also sometimes referred to as the surface layer 3 formed by the second particles 4b).

First Particles

The first particles 4a are particles for forming the convexities of the uneven shape of the surface layer 3. At the surface layer 3, the first particles 4a are the main component forming the convexities of the uneven shape of the surface layer 3. The first particles 4a may be primary particles, or secondary particles agglomerated from primary particles. At least a portion of the surface of the first particles 4a is covered by the second particles 4b. Namely, the surface of the first particles 4a may be completely covered by the second particles 4b, or the surface of the first particles 4a may have an exposed face that is not covered by the second particles 4b, with just a portion being covered by the second particles 4b.

If the separator is used in a battery, the convexities of the uneven shape of the surface layer 3 abut an opposing electrode, and a space corresponding to the concavities is formed between the separator and the electrode. At this point, it is preferred for the first particles 4a that are the main component of the convexities to function as a spacer for maintaining the space between the opposing electrode and the separator.

Spacer Function

The functioning of the first particles 4a as a spacer refers to a situation in which the particle height of the first particles 4a is reflected in the measurement (film thickness measurement) of the thickness of the surface layer. Namely, a situation in which the particle height of the first particles 4a is almost the same as the thickness of the surface layer. A situation in which the particle height of the first particles 4a is almost the same as the thickness of the surface layer refers to a case in which the difference between the particle height of the first particles 4a and the thickness of the surface layer is within 1 μm. In such a case, for example, the first particles 4a can be said to be functioning as a spacer forming a space between an electrode and the separator even when winder tension (a pulling tension force) is applied during electrode winding. Measurement of the thickness of the surface layer 3 can be carried out, for example, using a film thickness meter manufactured by Mitutoyo having a round, flat indenter having a diameter of 6 mm with a height gauge under compression of 1.8 kg/cm². The particle height of the first particles 4a is the difference in the thickness direction of the surface layer 3 between the lowest position and the highest position of the first particles 4a forming the convexities. The particle height of the first particles 4a can be determined by, for example, when a cross-section of the separator is observed with an SEM, in the thickness direction of the surface layer 3, drawing a line perpendicular to the thickness direction that passes through the lowest position and a line perpendicular to the thickness direction that passes through the highest position of the image of the first particles 4a, and measuring the length in the thickness direction between these two parallel lines. It is noted that the above-described average particle size is a value measured by a laser refraction method. This average particle size represents the maximum particle size when the particles were captured, and thus depending on the particle shape of the first particles 4a, the average particle size and the particle height may not always match.

Average Particle Size of First Particles

It is preferred that the average particle size of the first particles 4a is 3.5 μm or more. Namely, to ensure the coated film uniformity of the surface layer 3 formed by the second particles 4b, it is preferred to ensure that surface layer 3 formed by the second particles 4b has a thickness of 1.5 μm or more, and it is preferred that the concavity-convexity height difference of the uneven shape is 2 μm or more. In order to satisfy these preferred numerical ranges, it is preferred that the average particle size in the particle size distribution of the first particles 4a is 3.5 μm, which is the total value of the lower limit for the preferred range of the thickness of the surface layer 3 formed by the second particles 4b and the lower limit for the preferred range of the concavity-convexity height difference. Although the expansion absorption volume increases the larger the average particle size is, if the average particle size is too large, the volume of the first particles 4a in the battery obviously will increase, so that capacity tends to decrease. In the present technology, since the thickness of the surface layer 3 can also be measured based on the size of the first particles 4a, during cell design, particles having a size that is based on the thickness of the required separator (or the thickness of the surface layer 3) may be selected as the first particles 4a.

Second Particles

The second particles 4b are particles having a smaller average particle size than the first particles 4a. The second particles 4b may be primary particles, or secondary particles agglomerated from primary particles. The second particles 4b cover at least a portion of the surface of the first particles 4a, and cover at least a part of the surface of the substrate 2 that is exposed between the first particles. The second particles 4b have a function for further increasing the heat resistance conferred to the substrate 2, a function for further increasing the oxidation resistance conferred to the substrate 2, a function for preventing the first particles 4a from dropping out, and a function for further increasing the mechanical strength of the separator.

The second particles 4b cover, between the first particles 4a, an exposed face of the substrate 2 that is not covered by the first particles 4a, and have a function for further increasing the oxidation resistance and the heat resistance conferred to the substrate 2. The second particles 4b have a function for preventing the first particles 4a from dropping out. Namely, the second particles 4b covering the surface of the substrate 2 form a base layer that acts as a base of the first particles 4a. The first particles 4a are arranged so that some of the first particles 4a are embedded in this base layer. Consequently, the adhesion area of the first particles 4a is increased, so that falling out of the first particles 4a can be suppressed.

For example, with just a surface layer 3 that includes first particles 4a having a large particle size and a resin material, not only is heat resistance insufficient, but it tends to be impossible to ensure oxidation resistance due to stripping of the first particles 4a and the exposure of the surface of the substrate 2. Further, with just a substrate 2 that is formed without a surface layer 3, it tends to be impossible to ensure heat resistance and oxidation resistance.

Average Particle Size of Second Particles

It is preferred that the average particle size of the second particles 4b is 0.1 μm or more to 1.0 μm or less. If the second particles 4b are less than 0.1 μm, coating tends to be difficult due to the viscosity of the paint being too high. On the other hand, if the average particle size exceeds 1.0 μm, it tends to be difficult to ensure uniformity of the coated film, and properties such as oxidation resistance and short circuiting resistance tend to deteriorate because of a higher likelihood of the substrate 2 being exposed.

It is preferred that the thickness of the surface layer 3 formed by the second particles 4b that cover the surface of the surface layer 3 is 1.5 μm or more to 3.0 μm or less. If the thickness of the surface layer 3 formed by the second particles 4b is less than 1.5 μm, the surface of the substrate 2 is exposed and the substrate 2 and the electrode come into contact, so that the effect of an increase in the oxidation resistance conferred to the substrate 2 tends to decrease. If the thickness of the surface layer 3 formed by the second particles 4b is more than 3.0 μm, the conferred oxidation resistance is too much, and the concavity-convexity height difference formed with the first particles 4a decreases, so that the electrode expansion absorption effect is reduced, which is not desirable. It is noted that the thickness of the surface layer 3 formed by the second particles 4b is a value obtained by, for example, peeling a part of the surface layer 3 with tape, and measuring the step difference between the surface layer 3 formed by the second particles 4b and the exposed portion of the surface of the substrate 2 using a laser microscope (Trade name: VK-9500, manufactured by Keyence Corporation).

Electrode Expansion Absorption Effect of Separator

The electrode expansion absorption effect of the separator according to the present technology will now be described with reference to FIGS. 3A and 3B. FIG. 3A is schematic diagram illustrating a configuration example of an electrode and a separator before expansion. FIG. 3B is schematic diagram illustrating a configuration example of an electrode and a separator after expansion. As illustrated in FIGS. 3A and 3B, a separator in which the surface layer 3 is formed on both main faces of the substrate 2 is arranged between a positive electrode 21 and a negative electrode 22. As illustrated in FIG. 3A, before expansion of the negative electrode 22, the convexities of the surface layer 3 are abutting an electrode, and a space corresponding to the concavities of the surface layer 3 is formed between the separator and the electrode. Specifically, the convexities of the surface layer 3 formed on one of the main faces of the substrate 2 abut the opposing negative electrode 22, and a space corresponding to the concavities is formed between the negative electrode 22 and the separator. Further, the convexities of the surface layer 3 formed on the other main face of the substrate 2 abut the opposing positive electrode 21, and a space corresponding to the concavities is formed between the positive electrode 21 and the separator. As illustrated in FIG. 3B, after expansion of the negative electrode 22 due to charging, stress is concentrated on the convexities of the surface layer 3. This causes the substrate 2 to deform so that it can conform with the expansion of the negative electrode 22, and the space formed with respect to the separator to be filled by the expanded negative electrode 22. The space between the separator and the negative electrode 22 absorbs the expansion in volume of the negative electrode 22, which allows damage and fracturing of the electrodes due to expansion pressure to be suppressed.

Thus, for a separator that has the surface layer 3 having an uneven shape formed by the first particles 4a and the second particles 4b according to the present technology, a space corresponding to the concavities is formed between the negative electrode 22 and the separator. This space allows damage and fracturing of the electrodes due to expansion pressure to be suppressed by absorbing the expansion in volume of the negative electrode 22.

Regarding the separator that has the surface layer 3 having an uneven shape formed by the first particles 4a and the second particles 4b according to the present technology, from a perspective such as further increasing the effect of absorbing the expansion in the volume of the negative electrode 22, it is preferred to set the density of the convexities of the uneven shape and the concavity-convexity height difference of the uneven shape to suitable values. Such settings are especially effective if the separator is applied in a battery using an alloy-based negative electrode material that exhibits large expansion due to charging.

Convexity Density

The density of the convexities of the uneven shape of the surface layer 3 is preferably, for example, 300 per $mm^2$ or more to 2,800 per $mm^2$ or less. If the convexity density is too high, the portion of the substrate 2 that is compressed by particles having a large particle size due to expansion of the negative electrode increases, so that cycling characteristics and the rate characteristics tend to deteriorate. Further, the typical size of a particulate alloy-based negative electrode material in a lithium ion battery is 3 μm or more to 30 μm or less. To make the distance between the convexities larger than the size of this alloy-based negative electrode material, the convexity density is preferably 2,800 per $mm^2$ or less. If the convexity density is 2,800 per $mm^2$ or less, concavities having a distance between convexities of 30 μm or more are present. Expansion in the volume of an alloy-based negative electrode material can be better absorbed by concavities having a distance between convexities of 30 μm or more.

On the other hand, although a lower convexity density allows a greater volume of negative electrode expansion to be absorbed, if the convexity density is too low, the distance between convexities is too large, so that the spacer function of the first particles 4a forming the convexities is not exhibited. In order to exhibit the spacer function of the first particles 4a, it is preferred that the convexity density is 300 per $mm^2$ or more. It is noted that it is more preferred for not only the convexity density to be 300 per $mm^2$ or more to 2,800 per $mm^2$ or less, but also for the average particle size of the first particles 4a to be 3.5 μm or more. This is because even if the convexity density is 300 per $mm^2$ or more to 2,800 per $mm^2$ or less, if the average particle size of the first particles 4a is less than 3.5 μm, the effect of absorbing the expansion of the volume of the alloy-based negative electrode material is reduced.

Uneven Shape Concavity-Convexity Height Difference

It is preferred that the concavity-convexity height difference of the uneven shape of the surface layer 3 is, for example, 2.0 μm or more. If the concavity-convexity height difference of the uneven shape is less than 2.0 μm, the space between the negative electrode and the separator for absorbing the expansion in the volume of the alloy-based negative electrode material corresponding to the concavities decreases, so that the effect of absorbing the expansion in the volume of the negative electrode tends to decrease. It is noted that from the perspective of further increasing the effect of absorbing the expansion in the volume of the alloy-based negative electrode material, it is more preferred for not only the concavity-convexity height difference of the uneven shape of the surface layer 3 to be 2.0 μm or more, but also for the convexity density to be 300 per $mm^2$ or more to 2,800 per $mm^2$ or less.

The particles constituting the first particles 4a and the second particles 4b and the resin material included in the surface layer 3 will now be described in more detail.

The first particles 4a and the second particles 4b are electrically insulating particles that are both either inorganic particles or organic particles, for example.

Inorganic Particles

Examples of the inorganic particles include particles of a metal oxide, a metal nitride, a metal carbide, a metal sulfide and the like, which are inorganic particles that have an electrical insulating property. Examples of metal oxides that can be preferably used include aluminum oxide (alumina, $Al_2O_3$), boehmite (hydrated aluminum oxide), aluminum hydroxide, magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$) and the like. Examples of metal nitrides that can be preferably used include silicon nitride ($Si_3N_4$), aluminum nitride (AlN), boron nitride (BN), titanium nitride and the like. Examples of metal carbides that can be preferably used include silicon carbide (SiC), boron carbide ($B_4C$) or the like. Examples of metal sulfides that can be preferably used include barium sulfate ($BaSO_4$) and the like. Further, it is also possible to uses minerals, such as porous aluminosilicates like zeolite ($M_{2/n}O \cdot Al_2O_3 \cdot xSiO_2 \cdot yH_2O$, wherein M represents a metal element, $x \geq 2$, $y \geq 0$) and the like, layered silicates, barium titanate ($BaTiO_3$), or strontium titanate ($SrTiO_3$). Among these, it is preferred to use alumina, titania (especially titania having a rutile structure), silica, or magnesia, and it is more preferred to use alumina Inorganic particles have oxidation resistance and heat resistance, so that the surface layer 3 on the side opposing the positive electrode that contains inorganic particles has a strong resistance to even the oxidative environment near the positive electrode during charging. The shape of the inorganic particles is not especially limited. Any shape may be employed, such as spherical, plate-shaped, fibrous, cubic, a random shape and the like.

Organic Particles

Examples of the material constituting the organic particles include resins having a high heat resistance in which at least a melting point or a glass transition temperature is 180° C. or more, for instance a fluororesin, such as polyvinylidene fluoride and polytetrafluoroethylene, a fluorine-containing rubber, such as a vinylidene fluoride/tetrafluoroethylene copolymer and an ethylene/tetrafluoroethylene copolymer, a rubber, such as a styrene/butadiene copolymer or a hydride thereof, an acrylonitrile/butadiene copolymer or a hydride thereof, an acrylonitrile/butadiene/styrene copolymer or a hydride thereof, a methacrylate/acrylate copolymer, a styrene/acrylate copolymer, an acrylonitrile/acrylate copolymer, an ethylene propylene rubber, a polyvinyl alcohol, and a polyvinyl acetate, a cellulose derivative, such as ethyl cellulose, methyl cellulose, hydroxyethyl cellulose, and carboxymethyl cellulose, a polyphenylene ether, a polysulfone, a polyether sulfone, a polyphenylene sulfide, a polyetherimide, a polyimide, polyimides such as a wholly aromatic polyamide (an aramid), a polyamide-imide, polyacrylonitrile, a polyvinyl alcohol, a polyvinyl ether, a polyether, an acrylic resin, or a polyester. These resin materials can be used alone or as a mixture of two or more thereof. Among these, from the perspective of oxidation resistance and flexibility, a fluororesin, such as polyvinylidene fluoride is preferred, and from the perspective of heat resistance, it is preferred to include aramid or a polyamide-imide. The shape of the organic particles is not especially limited. Any shape may be employed, such as spherical, plate-shaped, fibrous, cubic, a random shape and the like.

The first particles 4a and the second particles 4b may be formed from particles of a single material type. Alternatively, the first particles 4a may be formed from particles of a single material type, and the second particles 4b formed from particles of a single material type different to the first particles 4a. Further, the first particles 4a may be formed from particles of a plurality of material types, and the second particles 4b formed from a plurality of material types different to the first particles 4a. Still further, the first particles 4a may be formed from particles of a plurality of material types, and the second particles 4b formed from the same plurality of material types as the first particles 4a.

Resin Material

Examples of the resin material constituting the surface layer 3 include resins having a high heat resistance in which at least a melting point or a glass transition temperature is 180° C. or more, for instance a fluororesin, such as polyvinylidene fluoride and polytetrafluoroethylene, a fluorine-containing rubber, such as a vinylidene fluoride/tetrafluoroethylene copolymer and an ethylene/tetrafluoroethylene copolymer, a rubber, such as a styrene/butadiene copolymer or a hydride thereof, an acrylonitrile/butadiene copolymer or a hydride thereof, an acrylonitrile/butadiene/styrene copolymer or a hydride thereof, a methacrylate/acrylate copolymer, a styrene/acrylate copolymer, an acrylonitrile/acrylate copolymer, an ethylene propylene rubber, a polyvinyl alcohol, and a polyvinyl acetate, a cellulose derivative, such as ethyl cellulose, methyl cellulose, hydroxyethyl cellulose, and carboxymethyl cellulose, a polyphenylene ether, a polysulfone, a polyether sulfone, a polyphenylene sulfide, a polyetherimide, a polyimide, polyimides such as a wholly aromatic polyamide (an aramid), a polyamide-imide, polyacrylonitrile, a polyvinyl alcohol, a polyvinyl ether, a polyether, an acrylic resin, or a polyester. These resin materials can be used alone or as a mixture of two or more thereof. Among these, from the perspective of oxidation resistance and flexibility, a fluororesin, such as polyvinylidene fluoride is preferred, and from the perspective of heat resistance, it is preferred to include aramid or a polyamide-imide.

The separator according to the present technology can exhibit remarkable effects by applying in a battery in which an alloy-based material including an element capable of forming an alloy with lithium as a negative electrode active material. For a negative electrode in which an alloy-based negative electrode material is used as a negative electrode active material, expansion during charging is substantial. Consequently, when the separator according to the present technology is applied in a battery in which an alloy-based negative electrode material us used as a negative electrode active material, there is an increase in the effect of preventing damage and fracturing of the electrode by the surface layer 3 absorbing the expansion of the negative electrode. It is noted that the separator according to the present technology may also be applied in a battery that uses a carbon material, such as graphite, as a negative electrode active material.

The separator according to the present technology can exhibit even more remarkable effects by laminating a positive electrode and a negative electrode with the separator interposed therebetween, and applying in a battery that includes the wound wound electrode structure. For a wound electrode body, since tensile stress is applied in the winding direction of the negative electrode current collector due to the expansion of the negative electrode, the negative electrode current collector is more susceptible to plastic deformation than the laminated electrode body. In this case, cracking, peeling, chipping or the like can also occur in the negative electrode active material layer. Further, if the tensile stress is large, the negative electrode current collector may even fracture. By using the separator according to the present technology, the load on the electrode caused by the winding structure of the would electrode body can be reduced, and the effect of preventing damage and fracturing of the electrode by the surface layer 3 absorbing the expansion of the negative electrode increases.

It is preferred that the thickness of the surface layer 3 is 3.5 μm or more to 20 μm or less. If the thickness is less than the above range, the function of absorbing expansion of the negative electrode deteriorates. Further, if the thickness is more than the above range, the thickness of the separator itself increases, which leads to a deterioration in the volumetric efficiency of the battery. It is noted that the surface layer 3 has an uneven shape, it does not have a uniform thickness. Measurement of the thickness of the surface layer 3 can be carried out, for example, using a film thickness meter manufactured by Mitutoyo having a round, flat indenter having a diameter of 6 mm under compression of 1.8 kg/cm². Here, if the surface layer 3 is formed on both faces of the substrate 2, a thickness T is the thickness of the surface layer 3 formed on a single face of the substrate 2.

The above-described thickness of the surface layer 3 is the value when the separator is formed. The surface layer 3 is compressed during charging and discharging of the battery, which causes the thickness to decrease. Consequently, when a battery fabricated using the separator according to the present technology that has been charged is disassembled, the thickness is less than when the separator was formed. However, since the first particles 4a of the present technology and the convexity density thereof hardly change, the structure of the surface layer 3 can be easily determined even when disassembling a battery that has been charged.

(Separator Production Method)

The method for producing the separator on which the surface layer 3 is provided will now be described.

First, a resin solution for forming the surface layer 3 is prepared. The resin solution is obtained by mixing the resin material, the first particles 4a, and the second particles 4b that form the surface layer 3 in a predetermined mass ratio, and then dispersing the resultant mixture in a dispersion medium such as N-methyl-2-pyrrolidone to dissolve the resin material.

As the dispersion medium used in the resin solution, any kind may be used as long as it can dissolve the resin material according to the present technology. Examples of the dispersion medium include, in addition to N-methyl-2-pyrrolidone, dimethylacetamide, dimethylformamide, dimethylsulfoxide, toluene, acetonitrile or the like. However, from the perspectives of solubility and a high dispersibility, it is preferred to use N-methyl-2-pyrrolidone.

Next, the surface layer 3 is formed on the surface of the substrate 2. A coated layer is formed by coating the resin solution on at least one surface of the substrate 2. Next, the substrate 2 on which the coated layer was formed is dipped in water or the like, which is a congealing solution, and then dried. Consequently, the surface layer 3 is formed having an uneven shape. The congealing solution into which the substrate 2 on which the coated layer was formed is dipped is, for example, water, which is for the resin solution, a poor solvent for the resin material dissolved in the resin solution, and a good solvent for the dispersion medium that dissolves the resin material. By dissolving the resin material and bringing the resin solution that includes the first particles 4a and the second particles 4b into contact with a solvent, such as water, which is a poor solvent for the resin material dissolved in the resin solution, and a good solvent for the dispersion medium that dissolves the resin material, solvent exchange occurs. Consequently, a sudden (at a fast rate) phase separation occurs with spinodal decomposition, so that the resin material is fixed in a specific three-dimensional network structure. The thus-produced surface layer 3 forms a specific porous structure based on the utilization of a sudden poor solvent-induced phase separation phenomenon that occurs with spinodal decomposition due to the poor solvent. In addition, based on this structure, excellent non-aqueous electrolyte solution impregnation properties and ion conductivity can be realized. Further, when forming the surface layer 3 on the surface of the substrate 2, the surface layer 3 can be directly dried without dipping in the congealing solution. In this case, although the resin material is not formed in the specific three-dimensional network structure, strong binding of the substrate surface or among the particles is possible. In this manner, the separator according to the present technology can be obtained.

In the separator production method according to the present technology, a surface layer having an uneven shape can be produced based on a process of preparing a resin solution that includes two kinds of particles that have different particle sizes, and coating and drying this resin solution. For example, in Patent Literature 2 (JP 2003-157888A) discussed in the section "Background Art", since there is a large number of processes in order to form the space between an electrode and the separator, such as sandwiching a spacer and removing the spacer when producing the laminated electrode body, productivity deteriorates.

The separator according to the present technology can suppress damage and fracturing of the electrodes by absorbing expansion in the volume of the negative electrode. Further, the separator according to the present technology can improve heat resistance and oxidation resistance. In addition, the separator according to the present technology can improve the ease with which the winding core can be removed by decreasing friction with the uneven shape of the surface layer 3. Still further, the separator according to the present technology can improve the infusion properties and the retention properties of the electrolyte solution with the uneven shape of the surface layer 3. Still even further, the separator according to the present technology functions as a supply source of the electrolyte solution during electrode expansion and compression. Moreover, since the porous structure of the substrate 2 can be maintained due to the surface layer 3 alleviating compression of the substrate 2, power characteristics can be improved. Possible configurations of the separator according to the present technology may include the following based on which face the surface layer 3 having an uneven structure is formed on.

1. Case in which the Surface Layer Having an Uneven Structure is Formed Only on the Face Opposing the Negative Electrode Side A surface layer 3 that is formed on the face opposing the negative electrode side is in contact with the negative electrode that expands during charging. Further, when the negative electrode has expanded, the space corresponding to the concavities of the uneven shape between the separator and the electrode absorbs the expansion in the volume of the negative electrode 22, which allows damage and fracturing of the electrodes caused by the expansion force to be suppressed.

When the surface layer 3 is provided on only the face opposing the negative electrode, the separator face opposing the positive electrode may be configured so that the substrate 2 is exposed, or a flat surface layer 3 may be provided. It is especially preferred to provide a flat surface layer 3 on the face opposing the positive electrode.

It is known that near a positive electrode having a high potential, which tends to be placed in an oxidative environment, a substrate formed from a polyolefin, especially a substrate formed from polyethylene is subjected to oxidative degradation by the positive electrode potential. Especially, for a battery in which the fully charged voltage is set at 4.25 V or more, degradation is even more substantial. Consequently, heat resistance and oxidation resistance can be conferred to the separator face opposing the positive electrode to suppress degradation by providing the surface layer 3 having heat resistance and oxidation resistance that is formed from the resin material, the first particles 4a, and the second particles 4b on the face opposing the positive electrode. Therefore, for a battery in which the fully charged voltage is set at 4.25 V or more, the function for effectively absorbing expansion of the negative electrode may be conferred to only the surface layer 3 on the side opposing the negative electrode, and the surface layer 3 on the side opposing the positive electrode may have a flat shape.

2. Case in which the Surface Layer Having an Uneven Structure is Formed Only on the Face Opposing the Positive Electrode Side If the fully-charged voltage of the battery is set at 4.2 V or less, for example, oxidative degradation of the polyethylene substrate like that described above does not occur as easily. On the other hand, if conductive metal contaminants have infiltrated inside the battery, internal short-circuiting can occur, which can cause a decline in safety.

If metal contaminants come in between the positive electrode and the separator, since in many cases such contaminants will be dissolved by the positive electrode potential, internal short-circuiting do not occur as easily. However, when metal contaminants come in between the negative electrode and the separator, since such contaminants cannot be dissolved by the negative electrode potential, the risk of internal short-circuiting is increased. At this point, by configuring so that the face opposing the negative electrode side is a uniform surface layer 3, a surface layer 3 having a predetermined thickness or more covers the metal contaminants, enabling short circuiting to be suppressed. Further, even if the surface layer 3 is provided only on the separator face opposing the positive electrode, the substrate 2 is pressed toward the positive electrode side by the expansion of the negative electrode, and that force can be absorbed by the surface layer 3 having an uneven shape that is provided on the face opposing the positive electrode. Therefore, the function for absorbing expansion of the negative electrode can be conferred to just the surface layer 3 on the face opposing the positive electrode, and the surface layer 3 on the face opposing the negative electrode can be made to function as a layer having a function for suppressing internal short-circuiting. Further, a space between the structure and the electrode can be secured without having to use the excessively large first particles 4a on the negative electrode side.

3. Case in which the Surface Layer Having an Uneven Structure is Formed on Both Faces of the Substrate If the necessity to consider problems like a high charging voltage and metal contaminants such as described above is low, it is preferred that the surface layer 3 is provided on both faces of the substrate 2. This is because an expansion absorption function can be obtained by both faces of the substrate 2, respectively.

Modified Examples

Further, in a battery using a gel electrolyte layer, which is a gel-like nonaqueous electrolyte, the surface layers according to the present technology may be combined by incorporating a predetermined amount of the first particles 4a and the second particles 4b in the gel electrolyte layer. The gel electrolyte layer includes a nonaqueous electrolyte solution and a polymer compound that holds the nonaqueous electrolyte. Consequently, when coating a precursor solution that includes the nonaqueous electrolyte solution, the polymer compound, as well as the first particles 4a and the second particles 4b on the positive electrode and the negative electrode, or on the separator surface, and drying, a similar surface layer to that according to the present technology can be formed between the positive electrode and the negative electrode by forming a gel electrolyte layer whose surface has an uneven shape like in the present technology.

2. Second Embodiment

A nonaqueous electrolyte battery according to a second embodiment of the present technology will now be described. The nonaqueous electrolyte battery according to the second embodiment of the present technology is a nonaqueous electrolyte battery that uses the separator according to the first embodiment of the present technology. (Structure of Nonaqueous Electrolyte Battery)

Figure 4:
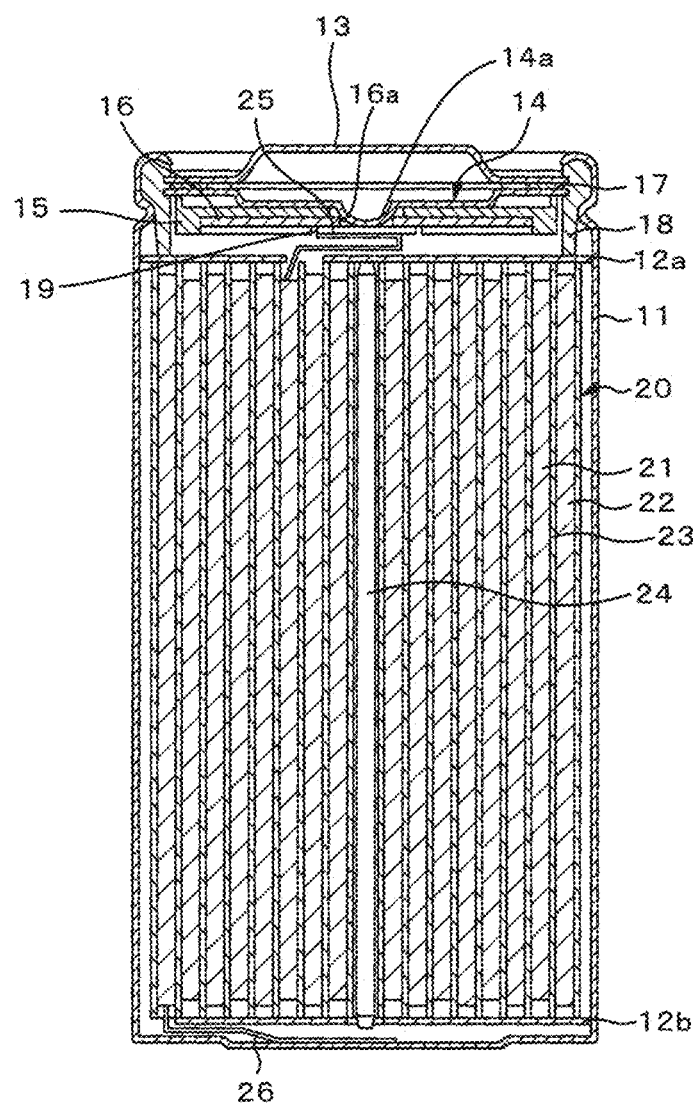
FIG. 4 is a cross-sectional view illustrating an example of a nonaqueous electrolyte secondary battery according to a second embodiment of the present technology.

The nonaqueous electrolyte battery according to the second embodiment of the present technology will now be described with reference to FIG. 4. FIG. 4 is a cross-sectional view illustrating an example of a structure of a nonaqueous electrolyte battery according to the second embodiment of the present technology. The nonaqueous electrolyte battery is, for example, a nonaqueous electrolyte secondary battery capable of charging and discharging. This nonaqueous electrolyte battery is a so-called cylindrical type, which includes a not-illustrated liquid nonaqueous electrolyte (hereinafter, referred to as nonaqueous electrolyte solution as appropriate) and a wound electrode body 20 formed by winding the strip-like positive electrode 21 and negative electrode 22 with a separator 23 that is configured in the same manner as in the first embodiment of the present technology interposed therebetween, in the inside of a generally hollow columnar battery can 11.

The battery can 11 is formed from nickel-plated iron, for example, and one end of the battery can 11 is closed and the other end is open. In the inside of the battery can 11, a pair of insulating plates 12a and 12b are respectively arranged perpendicularly to the winding periphery so as to sandwich the wound electrode body 20.

Examples of materials for the battery can 11 include iron (Fe), nickel (Ni), stainless steel (SUS), aluminum (Al), titanium (Ti) and the like. In order to prevent corrosion by an electrochemical electrolyte nonaqueous electrolyte solution due to charge/discharge of the nonaqueous electrolyte battery, the battery can 11 may be plated with, for example, nickel and the like. The open end portion of the battery can 11 is provided with a battery cap 13 which is a positive electrode lead plate, and a safety valve mechanism and a positive temperature coefficient (PTC) element 17 provided on an inner side of the battery cap 13, by caulking via a gasket 18 for insulating and sealing.

The battery cap 13 is formed from the same material as the battery can 11, for example, and includes an open end portion for exhausting a gas generated inside the battery. In the safety valve mechanism, a safety valve 14, a disc holder 15, and a cutting-off disc 16 are sequentially laminated. A protruding portion 14a of the safety valve 14 is connected to the positive electrode lead 25 led from the wound electrode body 20, with a sub disc 19, which is arranged so as to cover an opening 16a provided in a center portion of the cutting-off disc 16, interposed between the protruding portion 14a and the positive electrode lead 25. By connecting the safety valve 14 and the positive electrode lead 25 with the sub disc 19 interposed therebetween, the positive electrode lead 25 is prevented from being drawn into the opening 16a when the safety valve 14 is reversed. Further, the safety valve mechanism is electrically connected to the battery cap 13 via the positive temperature coefficient element 17.

When the internal pressure of the nonaqueous electrolyte battery has reached a predetermined value or more due to a short circuit inside the battery, heating from the outside of the battery or the like, the safety valve 14 is reversed, so that the safety valve mechanism cuts electrical connection between the protruding portion 14a (i.e., the battery can 13) and the wound electrode body 20. Namely, when the safety valve 14 is reversed, the cutting-off disc 16 applies pressure on the positive electrode lead 25 so that the safety valve 14 becomes disconnected to the positive electrode lead 25. The disc holder 15 is formed from an insulating material, and when the safety valve 14 is reversed, the safety valve 14 becomes isolated from the cutting-off disc 16.

Further, when even more gas is generated inside the battery and the internal pressure of the battery further increases, the safety valve 14 is configured so that a part of it can be split open to let the gas can be exhausted to the battery cap 13 side.

Furthermore, for example, a plurality of gas release openings (not shown) are provided in the periphery of the opening 16a of the cutting-off disc 16 so that the gas can be exhausted effectively to the battery cap 13 side when the gas is generated from the wound electrode body 20.

When the temperature increases, the resistivity of the positive temperature coefficient element 17 increases and the positive temperature coefficient element 17 cuts off current by cutting the electrical connection between the battery cap 13 and the wound electrode body 20, so that abnormal heat generation due to overcurrent is prevented. The gasket 18 is formed from an insulating material for example, and asphalt is applied on a surface of the gasket 18.

The wound electrode body 20 housed in the nonaqueous electrolyte battery is wound around a center pin 24. The wound electrode body 20 is formed by sequentially laminating the positive electrode 21 and the negative electrode 22 with the separator 23 interposed therebetween, and by winding the laminate in the longitudinal direction.

The positive electrode lead 25 is connected to the positive electrode 21, and a negative electrode lead 26 is connected to the negative electrode 22. The positive electrode lead 25 is, as described above, electrically connected to the battery cap 13 by welding to the safety valve 14, and the negative electrode lead 26 is electrically connected to the battery can 11 by welding.

Figure 5:
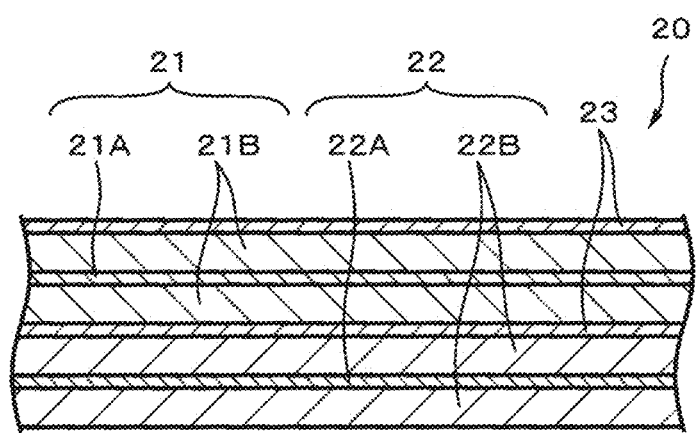
FIG. 5 is an expanded cross-sectional view of a portion of a wound electrode body 20 illustrated in FIG. 4.

FIG. 5 is an expanded cross-sectional view of a portion of the wound electrode body 20 illustrated in FIG. 4. The positive electrode 21, the negative electrode 22, and the separator 23 will be described in more detail below.

Positive Electrode

The positive electrode 21 has, for example, a structure in which a positive electrode active material layer 21B is provided on both faces of a positive electrode current collector 21A that has a pair of opposing faces. It is noted that, although not illustrated, the positive electrode active material 21B may also be provided on just one face of the positive electrode current collector 21A. The positive electrode current collector 21A is formed from, for example, metal foil, such as aluminum foil.

The positive electrode active material 21B contains as a positive electrode active material one type or two or more types of a positive electrode material capable of intercalating and deintercalating lithium. The positive electrode active material 21B may optionally also include other materials, such as a binder and a conducting agent.

Examples of a suitable positive electrode material capable of intercalating and deintercalating lithium include lithium-containing compounds, such as lithium oxide, lithium phosphorus oxide, lithium sulfide, or an intercalation compound containing lithium. Two or more of these may be mixed and used. To increase the energy density, a lithium-containing compound including lithium, a transition metal element, and oxygen (O) is preferred. Examples of such a lithium-containing compound include a lithium composite oxide having the layered rock-salt type structure represented by Chem. (I), a lithium complex phosphate having the olivine type structure represented by Chem. (II), and the like. It is more preferred that the lithium-containing compound is a compound including as a transition metal element at least one element selected from the group consisting of cobalt (Co), nickel (Ni), manganese (Mn), and iron (Fe). Examples of such a lithium-containing compound include a lithium composite oxide having the layered rock-salt type structure represented by Chem. (III), (IV), or (V), a lithium composite oxide having the spinel type structure represented by Chem. (VI), or a lithium complex phosphate having the structure having the olivine type structure represented by Chem. (VII). Specific examples include $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ ($c_1$≈1, $0<c_2<1$), $Li_dMn_2O_4$ (d≈1), $Li_eFePO_4$ (e≈1) or the like.

　　　　　　　Chem. (I)

(in the formula, however, M1 represents at least one of elements selected from 2 to 15 group elements except for nickel (Ni) and manganese (Mn); X represents at least one of 16 and 17 group elements except for oxygen (O); p, q, y, and z are values in ranges of 0≤p≤1.5, 0≤q≤1.0, 0≤r≤1.0, −0.10≤y≤0.20, and 0≤z≤0.2).

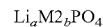　　　　　　　Chem. (II)

(in the formula, however, M2 represents at least one of elements selected from 2 to 15 group elements; a and b are values in ranges of 0≤a≤2.0 and 0.5≤b≤2.0).

　　　　　　　Chem. (III)

(in the formula, however, M3 represents at least one selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); f, g, h, j and k are values in ranges of 0.8≤f≤1.2, 0<g<0.5, 0≤h<0.5, g+h<1, −0.1≤j≤0.2, and 0≤k≤0.1. Note that the composition of lithium differs depending on the state of charge/discharge, and the value of f represents a value in a complete discharge state).

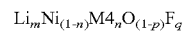　　　　　　　Chem. (IV)

(in the formula, however, M4 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); m, n, p, and q are values in ranges of 0.8≤m≤1.2, 0.005≤n≤0.5, −0.1≤p≤0.2, and 0≤q≤0.1. Note that the composition of lithium differs depending on the state of charge/discharge, and the value of m represents a value in a complete discharge state).

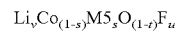　　　　　　　Chem. (V)

(in the formula, however, M5 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); r, s, t, and u are values in ranges of 0.8≤r≤1.2, 0≤s<0.5, −0.1≤t≤0.2, and 0≤u≤0.1. Note that the composition of lithium differs depending on the state of charge/discharge, and the value of r represents a value in a complete discharge state).

$$Li_v Mn_{(1-w)} M6_w O_x F_y \qquad \text{Chem. (VI)}$$

(in the formula, M6 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); v, w, x, and y are values in ranges of 0.9≤v≤1.1, 0≤w≤0.6, 3.7≤x≤4.1, and 0≤y≤0.1. Note that the composition of lithium differs depending on the state of charge/discharge, and the value of v represents a value in a complete discharge state).

$$Li_z M7PO_4 \qquad \text{Chem. (VII)}$$

(in the formula, however, M7 represents at least one selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr); z is a value in ranges of 0.9≤z≤1.1. Note that the composition of lithium differs depending on the state of charge/discharge, and the value of z represents a value in a complete discharge state).

Furthermore, from the perspective that a higher electrode filling performance and higher cycling characteristics can be obtained, composite particles obtained by coating a surface of core particles formed from any of the above-described lithium-containing compounds with microparticles formed from any other lithium-containing compound may also be used.

Other examples of the positive electrode material capable of intercalating and deintercalating lithium include oxides, disulfides, chalcogen compounds, or conductive polymers. Examples of oxides include vanadium oxide ($V_2O_5$), titanium dioxide ($TiO_2$), manganese dioxide ($MnO_2$) and the like. Examples of disulfides include iron disulfide ($FeS_2$), titanium disulfide ($TiS_2$), molybdenum disulfide ($MoS_2$) and the like. Examples of especially preferred chalcogen compounds include layered compounds and spinel type compounds, such as niobium selenide ($NbSe_2$). Examples of conductive polymers include sulfur, polyaniline, polythiophene, polypyrrole, polyacetylene or the like. Obviously, the positive electrode material may be a material other than that described above. Further, two or more kinds of the above-described series of positive electrode materials may be mixed in an arbitrary combination.

In addition, as the conducting agent, for example, a carbon material such as carbon black or graphite may be used. As the binder, for example, at least one kind selected from resin materials such as polyvinylidene difluoride (PVdF), polytetrafluoroethylene (PTFE), polyacrylonitrile (PAN), styrene-butadiene rubber (SBR), and carboxymethylcellulose (CMC), a copolymer having such a resin material as a main component and the like is used.

(Negative Electrode)

The negative electrode 22 has a structure in which a negative electrode active material layer 22B is provided on both faces of a negative electrode current collector 22A that has a pair of opposing faces. It is noted that, although not illustrated, the negative electrode active material 22B may also be provided on just one face of the negative electrode current collector 22A. The negative electrode current collector 22A is formed from, for example, metal foil, such as copper foil.

The negative electrode active material 22B includes as a negative electrode active material, for example, one type or two or more types of a negative electrode material capable of intercalating and deintercalating lithium. The negative electrode active material 22B may optionally also be formed including the same conducting agent and other material such as a binder as the positive electrode 21B.

It is noted that in this nonaqueous electrolyte battery the electrochemical equivalent of the negative electrode material capable of intercalating and deintercalating lithium is greater than the electrochemical equivalent of the positive electrode 21, so that lithium metal theoretically does not precipitate on the negative electrode 22 during charging.

Examples of the negative electrode material capable of intercalating and deintercalating lithium include carbon materials such as non-graphitizable carbon, graphitizable carbon, graphite, pyrocarbons, cokes, glassy carbons, an organic polymeric material burned substance, carbon fiber, activated carbon or the like. Among these, examples of cokes include pitch coke, needle coke, petroleum coke or the like. The organic polymeric material burned substance refers to a carbonized material obtained by baking a polymer material such as a phenol resin or a furan resin at an appropriate temperature. Some of such carbonized materials are classified as non-graphitizable carbon or graphitizable carbon. These carbon materials are preferred because they exhibit very little change in their crystal structure during charging and discharging, a high charge/discharge capacity can be obtained, and excellent cycling characteristics can be obtained. Graphite is especially preferred, as it has a large electrochemical equivalent and a high energy density can be obtained. Further, non-graphitizable carbon is preferable because excellent cycling characteristics can be obtained. Furthermore, it is preferable to use a carbon material having a low charge/discharge potential, i.e., a charge/discharge potential that is close to that of lithium metal, because the a higher energy density can be realized for the battery easily.

Examples of the negative electrode material capable of intercalating and deintercalating lithium further include materials capable of intercalating and deintercalating lithium and including one kind of element selected from among metal elements and semi-metal elements as a constituent element. Here, the negative electrode 22 including such a negative electrode material will be referred to as an alloy-based negative electrode. This is because a high energy density can be obtained with use of such a material. It is especially preferred to use together with a carbon material because this enables a high energy density as well as excellent cycling characteristics to be obtained. This negative electrode material may be a simple substance, an alloy, or a compound of the metal element or the semi-metal element, or may contain, at least partly, a phase of one or more of the simple substance, alloy, or compound of the metal element or the semi-metal element. Note that in the present technology, the term alloy includes, in addition to materials formed from two or more kinds of metal element, materials containing one or more kinds of metal element and one or more kinds of semi-metal element. Further, the alloy may contain a non-metal element. Examples of the compositional structure include a solid solution, a eutectic (eutectic mixture), an intermetallic compound, or a material in which two or more kinds thereof coexist.

Examples of the metal element or semi-metal element forming this negative electrode material include a metal element or a semi-metal element capable of forming an alloy with lithium. It is noted that a negative electrode material that includes such an element capable of forming an alloy with lithium is referred to as an alloy-based negative electrode material. Specific examples of the metal element or semi-metal element forming an alloy with lithium include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

It is preferable to use, as the negative electrode material, for example, a material containing, as a constituent element, a metal element or a semi-metal element of Group 4B in the short periodical table. It is more preferable to use a material containing at least one of silicon (Si) and tin (Sn) as a constituent element. It is even more preferable to use a material containing at least silicon. This is because silicon (Si) and tin (Sn) each have a high intercalating and deintercalating lithium capability, so that a high energy density can be obtained. Examples of the negative electrode material containing at least one of silicon and tin include a simple substance, an alloy, or a compound of silicon, a simple substance, an alloy, or a compound of tin, and a material containing, at least partly, a phase of one or more kinds thereof.

Examples of the alloy of silicon include alloys containing, as a second constituent element other than silicon, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of tin include alloys containing, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds containing oxygen (O) or carbon (C), which may contain any of the above-described second constituent elements in addition to tin (Sn) or silicon (Si).

Of these, as the negative electrode material, an SnCoC-containing material is preferable which contains cobalt (Co), tin (Sn), and carbon (C) as constituent elements, in which the carbon content is 9.9% by mass or more to 29.7% by mass or less, and the ratio of cobalt in the total of tin (Sn) and cobalt (Co) is 30% by mass or more to 70% by mass or less. This is because the high energy density and excellent cycling characteristics can be obtained in these composition ranges.

This SnCoC-containing material may also optionally contain another constituent element. For example, it is preferable to contain, as the other constituent element, silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), or bismuth (Bi), and two or more kinds of these elements may be contained. This is because the capacity or the cycling characteristics can be further improved.

It is noted that the SnCoC-containing material has a phase containing tin (Sn), cobalt (Co), and carbon (C), and this phase preferably has a low crystalline structure or an amorphous structure. Further, in the SnCoC-containing material, at least a part of carbon (C), which is a constituent element, is preferably bound to a metal element or a semi-metal element that is another constituent element. This is because, when carbon (C) is bound to another element, aggregation or crystallization of tin (Sn) or the like, which is considered to cause a decrease in cycling characteristics, can be suppressed.

Examples of a measurement method for examining the binding state of elements include X-ray photoelectron spectroscopy (XPS). In XPS, so far as graphite is concerned, a peak of the is orbit (C1s) of carbon appears at 284.5 eV in an energy-calibrated apparatus such that a peak of the 4f orbit (Au4f) of a gold (Au) atom is obtained at 84.0 eV. Also, so far as surface contamination carbon is concerned, a peak of the is orbit (C1s) of carbon appears at 284.8 eV. In contrast, when a charge density of the carbon element is high, for example, when carbon is bound to a metal element or a semi-metal element, the peak of C1s appears in a region lower than 284.5 eV. Namely, when a peak of a combined wave of C1s obtained regarding the SnCoC-containing material appears in a region lower than 284.5 eV, at least a part of carbon contained in the SnCoC-containing material is bound to a metal element or a semi-metal element, which is another constituent element.

In XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the SnCoC-containing material, the peak of the surface contamination carbon and the peak of the carbon in the SnCoC-containing material are separated from each other by means of analysis using, for example, a commercially available software program. In the analysis of the waveform, the position of a main peak existing on the lowest binding energy side is used as an energy reference (284.8 eV).

Further, examples of the negative electrode material capable of intercalating and deintercalating lithium include metal oxides, polymer compounds and the like that are capable of intercalating and deintercalating lithium. Examples of metal oxides include lithium titanate ($Li_4Ti_5O_{12}$), iron oxide, ruthenium oxide, molybdenum oxide and the like. Examples of polymer compounds include polyacetylene, polyaniline, polypyrrole and the like.

It is noted that the negative electrode material capable of intercalating and deintercalating lithium may be a material other than that described above. Further, two or more kinds of the above-described negative electrode materials may be mixed in an arbitrary combination.

The negative electrode active material layer 22B may be, for example, formed by any of a vapor phase method, a liquid phase method, a spraying method, a baking method, or a coating method, or two or more of these methods may be combined. When the negative electrode active material layer 22B is formed by adopting a vapor phase method, a liquid phase method, a spraying method, a baking method or by combining two or more of these methods, it is preferable that the negative electrode active material layer 22B and the negative electrode current collector 22A are alloyed on at least a part of an interface therebetween. Specifically, it is preferable that, on the interface, constituent elements of the negative electrode current collector 22A are diffused into the negative electrode active material layer 22B, constituent elements of the negative electrode active material layer 22B are diffused into the negative electrode current collector 22A, or these constituent elements are mutually diffused into each other. This is because not only breakage to be caused by the expansion and shrinkage of the negative electrode active material layer 22B due to the charge/discharge can be suppressed, but also electron conductivity between the negative electrode active material layer 22B and the negative electrode current collector 22A can be enhanced.

Examples of the vapor phase method include a physical deposition method and a chemical deposition method, specifically a vacuum evaporation method, a sputtering method, an ion plating method, a laser abrasion method, a thermal chemical vapor deposition (CVD) method, and a plasma chemical vapor deposition method. As the liquid phase method, known techniques such as electroplating and electroless plating can be adopted. The baking method refers to, for example, a method in which after a particulate negative electrode active material is mixed with a binder and the like, the mixture is dispersed in a solvent and applied, and the applied material is then heat treated at a temperature higher than a melting point of the binder or the like. As for the baking method, known techniques can also be used, and examples thereof include an atmospheric baking method, a reaction baking method, and a hot press baking method.

Separator

The separator 23 is the same as in the first embodiment.

Nonaqueous Electrolyte Solution

The nonaqueous electrolyte solution includes an electrolyte salt and a solvent in which the electrolyte salt is dissolved.

The electrolyte salt contains, for example, one or two or more kinds of a light metal compound such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among them, at least one selected from the group consisting of lithium hexafluorophosphate, lithium tetrafluoroborate, lithium perchlorate, and lithium hexafluoroarsenate is preferable, and lithium hexafluorophosphate is more preferable.

Examples of the nonaqueous solvent include lactone-based solvents (e.g., γ-butyrolactone, γ-valerolactone, δ-valerolactone, and ε-caprolactone), carbonate-based solvents (e.g., ethylene carbonate, propylene carbonate, butylene carbonate, vinylene carbonate, dimethyl carbonate, ethyl methyl carbonate, and diethyl carbonate), ether-based solvents (e.g., 1,2-dimethoxyethane, 1-ethoxy-2-methoxyethane, 1,2-diethoxyethane, tetrahydrofuran, and 2-methyltetrahydrofuran), nitrile-based solvents (e.g., acetonitrile), and solvents such as sulfolane-based solvents, phosphoric acids, phosphate solvents, and pyrrolidones. These nonaqueous solvents can be used alone or as a mixture of two or more thereof.

Further, as the nonaqueous solvent, it is preferable to use a mixture of a cyclic carbonate and a chain carbonate, and it is more preferable to contain a compound in which a part of or all of hydrogen in the cyclic carbonate or chain carbonate is fluorinated. As this fluorinated compound, it is preferable to use fluoroethylene carbonate (4-fluoro-1,3-dioxolan-2-one, FEC) or difluoroethylene carbonate (4,5-difluoro-1,3-dioxolan-2-one, DFEC). This is because, in a case of using the negative electrode 22 containing a compound such as silicon (Si), tin (Sn), or germanium (Ge) as the negative electrode active material, it is possible to increase charge/discharge cycling characteristics. In particular, it is preferred to use difluoroethylene carbonate as the nonaqueous solvent because the effect of an improvement in the cycling characteristics is excellent.

In addition, the nonaqueous electrolyte solution may be a gel electrolyte that is held in a polymer compound. The polymer compound that holds the nonaqueous electrolyte solution therein may absorb the nonaqueous solvent to form a gel. Examples of such a polymer compound may include a fluorine-based polymer compound (e.g., a copolymer containing polyvinylidene difluoride (PVdF), vinylidene fluoride (VdF), or hexafluoropropylene (HFP) in a repeating unit), an ether-based polymer compound (e.g., polyethylene oxide (PEO) or a crosslinked material containing polyethylene oxide (PEO)), a compound containing polyacrylonitrile (PAN), polypropylene oxide (PPO), or polymethyl methacrylate (PMMA) in a repeating unit. These polymer compounds can be used alone or as a mixture of two or more thereof.

In particular, in terms of stable redox properties, a fluorine-based polymer compound is preferable, and of those, a copolymer containing vinylidene fluoride and hexafluoropropylene as components is preferable. Further, this copolymer may also contain, as a component, a monoester of an unsaturated diprotic acid such as monomethyl maleate (MMM), a halogenated ethylene such as trifluorochloroethylene (PCTFE), a cyclic carbonate of an unsaturated compound such as vinylene carbonate (VC), an acrylic vinyl monomer containing an epoxy group or the like. This is because higher characteristics can be obtained.

(Nonaqueous Electrolyte Battery Production Method)

Positive Electrode Production Method

First, for example, a positive electrode mixture is prepared by mixing a positive electrode active material, a conducting agent, and a binder. This positive electrode mixture is dispersed in a solvent, such as N-methyl-2-pyrrolidone, to produce a paste-like positive electrode mixture slurry. Next, the positive electrode 21 is produced by coating this positive electrode mixture slurry on the positive electrode current collector 21A, drying, and compression-molding with a roll press or the like to form the positive electrode active material layer 21B.

Negative Electrode Production Method

A negative electrode mixture is prepared by mixing a negative electrode active material and a binder. This negative electrode mixture is dispersed in a solvent, such as N-methyl-2-pyrrolidone, to produce a paste-like negative electrode mixture slurry. Next, the negative electrode 22 is produced by coating this negative electrode mixture slurry on the negative electrode current collector 22A, drying, and compression-molding with a roll press or the like to form the negative electrode active material layer 22B.

Preparation of Nonaqueous Electrolyte Solution

The nonaqueous electrolyte solution is prepared by dissolving an electrolyte salt in a nonaqueous solvent.

Assembly of Nonaqueous Electrolyte Battery

The positive electrode lead 25 is attached to the positive electrode current collector 21A by welding or the like, and the negative electrode lead 26 is attached to the negative electrode current collector 22A by welding or the like. After that, the positive electrode 21 and the negative electrode 22 are wound with the separator 23 according to an embodiment of the present technology interposed therebetween to form the wound electrode body 20.

Next, a tip end of the positive electrode lead 25 is welded to the safety valve mechanism, and a tip end of the negative electrode lead 26 is welded to the battery can 11. Then, the surface where the wound electrode body 20 is wound is interposed between the pair of insulating plates 12a and 12b and housed in the inside of the battery can 11. After housing the wound electrode body 20 in the inside of the battery can 11, the nonaqueous electrolyte solution is injected into the inside of the battery can 11 and impregnated into the separator 23. After that, the battery cap 13, the safety valve mechanism including the safety valve 14 and the like, and the positive temperature coefficient element 17 are fixed to the open end portion of the battery can 11 by caulking via the gasket 18. In this manner, the nonaqueous electrolyte battery illustrated in FIG. 4 according to the present technology is formed.

In this nonaqueous electrolyte battery, when charging, for example, lithium ions are deintercalated from the positive electrode active material layer 21B and intercalated in the negative electrode active material layer 22B via the nonaqueous electrolyte solution with which the separator 23 is impregnated. Further, when discharge is performed, for example, lithium ions are deintercalated from the negative electrode active material layer 22B and intercalated in the positive electrode active material layer 21B via the nonaqueous electrolyte solution impregnated in the separator 23.

3. Third Embodiment (Configuration of Nonaqueous Electrolyte Battery)

Figure 6:
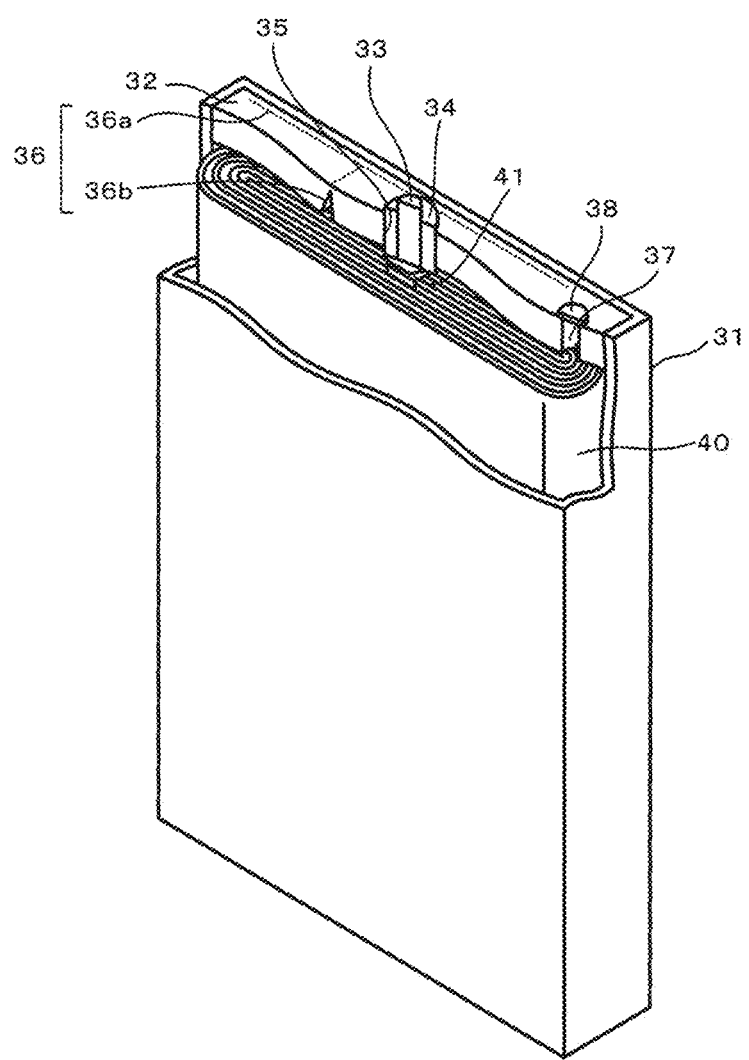
FIG. 6 is a perspective view illustrating a configuration of a nonaqueous electrolyte battery according to a third embodiment of the present technology.

The nonaqueous electrolyte battery according to the third embodiment of the present technology will now be described. FIG. 6 is a perspective view illustrating a configuration of a nonaqueous electrolyte battery according to a third embodiment of the present technology. This nonaqueous electrolyte battery is a so-called square battery, in which a wound electrode body 40 is housed in a square package can 31.

The nonaqueous electrolyte battery is configured from the square tube-shaped package can 31, the wound electrode body 40, which is a power generation element housed inside the package can 31, a battery cap 32 that closes an open end portion of the package can 31, an electrode pin 33 provided in roughly the center of the battery cap 32 and the like.

The package can 31 is formed from a conductive metal, such as iron (Fe), and has a square tubular hollow body that has a bottom. It is preferred that the inner face of this package can 31 has been plated with nickel or coated with a conductive paint so that the conductivity of the package can 31 is increased. Further, the peripheral face of the package can 31 may be, for example, covered with a packaging label formed from a plastic sheet, paper or the like, or coated with an insulating paint for protection. The battery cap is, similar to the package can 31, formed from a conductive metal, such as iron (Fe), for example.

The wound electrode body 40, which is configured in the same manner as in the second embodiment, is obtained by laminating the positive electrode and the negative electrode with the separator according to the first embodiment of the present technology interposed therebetween, and winding the laminate in a long and thin oval shape. Since the positive electrode, the negative electrode, the separator, and the nonaqueous electrolyte solution are the same as in the second embodiment, a detailed description thereof will be omitted here. Further, a gel-like nonaqueous electrolyte layer (gel electrolyte layer) in which the nonaqueous electrolyte solution is retained in a polymer compound may be formed between the separator and the positive electrode and the negative electrode.

Multiple positive electrode terminals 41 connected to a positive electrode current collector and multiple negative electrode terminals connected to a negative electrode current collector are provided in the thus-configured wound electrode body 40. All of the positive electrode terminals 41 and the negative electrode terminals are led to one end in the axis direction of the wound electrode body 40. Further, the positive electrode terminals 41 are connected by fixing means, such as soldering, to a bottom end of the electrode pin 33. In addition, the negative electrode terminals are connected by fixing means, such as soldering, to an inner face of the battery can 31.

The electrode pin 33 is formed from a conductive shaft member, and is held by an insulating body 34 so that a top portion thereof protrudes from the top end. The electrode pin 33 is fixed in roughly the center of the battery cap 32 via this insulating body 34. The insulating body 34 is formed from a material having high insulating properties, and engages with a through-hole 35 provided on a surface side of the battery cap 32. Further, the electrode pin 33 passes through the through-hole 35, and a tip end of the positive electrode terminals 41 is fixed to the bottom end face of the electrode pin 33.

The battery cap 32 that is provided with such an electrode pin 33 is engaged with the open end portion of the package can 31, and the contact face between the package can 31 and the battery cap 32 is joined by fixing means such as welding. Consequently, the open end portion of the package can 31 is hermetically sealed by the battery cap 32, so that the package can 31 is air-tight and liquid-tight. An internal pressure release mechanism 36 is provided in this battery cap 32 that lets internal pressure escape (be released) by making a part of the battery cap 32 rupture when the pressure inside the package can 31 is increased to a predetermined value or more.

The internal pressure release mechanism 36 is configured from two first aperture grooves 36a (one of the first aperture grooves 36a is not shown) extending in a straight line in a longitudinal direction at an inner face of the battery cap 32, and a second aperture groove 36b that extends in a width direction that is orthogonal to the longitudinal direction at the inner face of the battery cap 32 and that is in communication at either of its ends with the two first aperture grooves 36a. The two first aperture grooves 36a are provided parallel to each other so as to follow the long side peripheral edge of the battery cap 32 close to the inner side of the two long sides that are positioned so as to oppose the width direction of the battery cap 32. Further, the second aperture groove 36b is provided so as to be positioned roughly in the middle between one of the short side peripheral edges and the electrode pin 33 at one side in the longitudinal direction of the electrode pin 33.

The first aperture grooves 36a and the second aperture groove 36b both have, for example, a V-shape whose cross-section is open to the lower face side. It is noted that the shape of the first aperture grooves 36a and the second aperture groove 36b is not limited to the V-shape illustrated in this embodiment. For example, the first aperture grooves 36a and the second aperture groove 36b may have a U-shape or a semicircular shape.

An electrolyte solution injection port 37 is provided so as to pass through the battery cap 32. The electrolyte solution injection port 37, which is used to allow the nonaqueous electrolyte solution to be injected after the battery cap 32 and the package can 31 have been caulked, is hermetically sealed by a sealing member 38 after the nonaqueous electrolyte solution has been injected. Consequently, if the wound electrode body is produced by forming in advance a gel electrolyte between the positive electrode and negative electrode and the separator, it is not necessary to provide the electrolyte solution injection port 37 and the sealing member 38.

Separator

The separator has the same configuration as in the first embodiment.

Nonaqueous Electrolyte Solution

The nonaqueous electrolyte solution described in the second embodiment may be used for the nonaqueous electrolyte solution. Further, a gel electrolyte that holds the nonaqueous electrolyte solution in a polymer compound like that described in the second embodiment may be used.

(Nonaqueous Electrolyte Battery Production Method)

This nonaqueous electrolyte battery can be fabricated as follows, for example.

Positive Electrode and Negative Electrode Production Method

The positive electrode and the negative electrode can be produced by the same methods as described in the second embodiment.

Assembly of Nonaqueous Electrolyte Battery

The wound electrode body 40 is produced in the same manner as in the second embodiment, by sequentially laminating and winding the positive electrode and negative electrode with the separator into a long and thin oval shape. Then, the wound electrode body 40 is housed in the package can 31, which is a square can formed from a metal such as aluminum (Al) or iron (Fe), for example.

Further, after the electrode pin 33 provided in the battery cap 32 and the positive electrode terminals 41 led from the wound electrode body 40 have been connected, the battery cap 32 is sealed by, for example, injecting the nonaqueous electrolyte solution from the electrolyte solution injection port 37 and sealing with the sealing member 38. In this manner, the nonaqueous electrolyte battery can be obtained.

4. Fourth Embodiment

The nonaqueous electrolyte battery according to the fourth embodiment of the present technology will now be described. The fourth embodiment is a laminated film type nonaqueous electrolyte battery that uses the separator according to the first embodiment.

Figure 7:
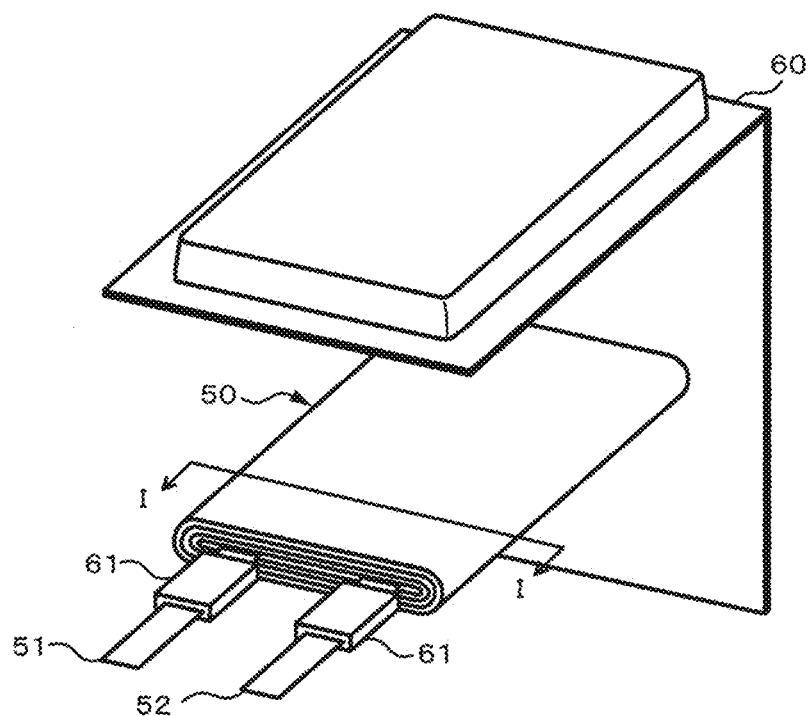
FIG. 7 is an exploded perspective view illustrating a configuration of a nonaqueous electrolyte battery according to a fourth embodiment of the present technology.

FIG. 7 is an exploded perspective view illustrating a configuration of a nonaqueous electrolyte battery according to a fourth embodiment of the present technology. This nonaqueous electrolyte battery is a so-called laminated film type, in which a wound electrode body 50 to which a positive electrode lead 51 and a negative electrode lead 52 are attached is housed inside a film-shaped package member 60.

The positive electrode lead 51 and the negative electrode lead 52 are each led out from the inside of the package member 60 toward the outside in the same direction, for example. The positive electrode lead 51 and the negative electrode lead 52 are each formed from, for example, a metal material such as aluminum, copper, nickel, stainless steel or the like, in a thin plate state or a network state.

The package member 60 is, for example, formed of a laminated film obtained by forming a resin layer on both surfaces of a metal layer. In the laminated film, an outer resin layer is formed on a surface of the metal layer, the surface being exposed to the outside of the battery, and an inner resin layer is formed on an inner surface of the battery, the inner surface being opposed to a power generation element such as the wound electrode body 50.

The metal layer plays a most important role to protect contents by preventing the entrance of moisture, oxygen, and light. Because of the lightness, stretching property, price, and easy processability, aluminum (Al) is most commonly used for the metal layer. The outer resin layer has beautiful appearance, toughness, flexibility, and the like, and is formed using a resin material such as nylon or polyethylene terephthalate (PET). Since the inner rein layers are to melt by heat or ultrasonic waves to be welded to each other, a polyolefin resin is appropriately used for the inner resin layer, and cast polypropylene (CPP) is often used. An adhesive layer may be provided as necessary between the metal layer and each of the outer resin layer and the inner resin layer.

A depression portion in which the wound electrode body 50 is housed is formed in the package member 60 by deep drawing for example, in a direction from the inner resin layer side to the outer resin layer. The package member 60 is provided such that the inner resin layer is opposed to the wound electrode body 50. The inner resin layers of the package member 60 opposed to each other are adhered by welding or the like in an outer periphery portion of the depression portion. A contact film 61 is provided between the package member 60 and each of the positive electrode lead 51 and the negative electrode lead 52 for the purpose of increasing the adhesion between the inner resin layer of the package member 60 and each of the positive electrode lead 51 and the negative electrode lead 52 which are formed using metal materials. This contact film 61 is formed using a resin material having high adhesion to the metal material, examples of which being polyolefin resins such as polyethylene, polypropylene, modified polyethylene, and modified polypropylene.

Note that the metal layer of the package member 60 may also be formed using a laminated film having another lamination structure, or a polymer film such as polypropylene or a metal film, instead of the aluminum laminated film formed using aluminum (Al).

Figure 8:
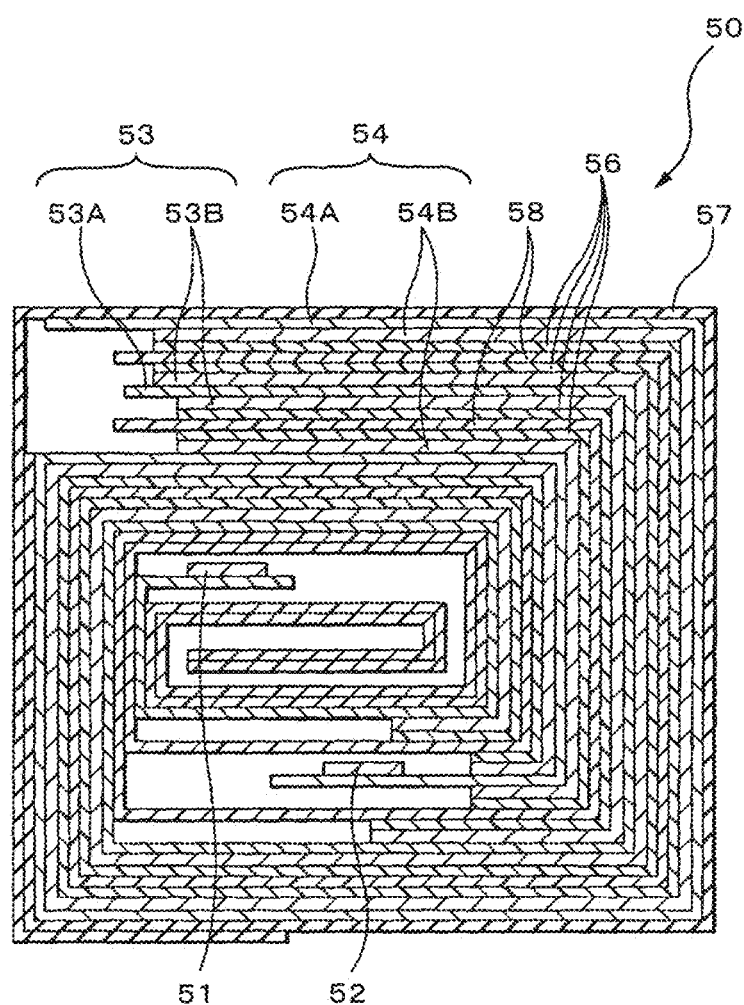
FIG. 8 is a cross-sectional view illustrating a cross-section along the line I-I illustrated in FIG. 7.

FIG. 8 is a cross-sectional view illustrating a cross-sectional structure along the line I-I of the wound electrode body 50 illustrated in FIG. 7. This wound electrode body 50 is prepared by laminating a positive electrode 53 and a negative electrode 54 with a separator 58 and a gel electrolyte 56 interposed therebetween and winding the laminate, and protecting an outermost peripheral portion thereof with a protective tape 37 as necessary.

Positive Electrode

The positive electrode 53 has a structure in which a positive electrode active material layer 53B is provided on one of or both faces of a positive electrode current collector 33A. The structure of the positive electrode current collector 53A and the positive electrode active material layer 53B is the same as that of the above-described positive electrode current collector 21A and the positive electrode active material layer 21B according to the third embodiment.

Negative Electrode

The negative electrode 54 has a structure in which a negative electrode active material layer 54B is provided on one of or both faces of a negative electrode current collector 54A, and the negative electrode active material layer 54B and the positive electrode active material layer 53B are opposed to each other. The structure of the negative electrode current collector 54A and the negative electrode active material layer 54B is the same as that of the above-described negative electrode current collector 22A and the negative electrode active material layer 22B according to the second embodiment.

Separator

The separator 58 is the same as in the first embodiment.

Nonaqueous Electrolyte

The gel electrolyte 56, which is a nonaqueous electrolyte that includes a nonaqueous electrolyte solution and a polymer compound serving as a carrier that retains this nonaqueous electrolyte solution, is in a so-called gel state. A gel-like electrolyte is preferred, because not only can a high ion conductivity be obtained, but leakage from the battery can be prevented. It is noted that in the nonaqueous electrolyte battery according to the fourth embodiment, the same nonaqueous electrolyte solution as in the second embodiment may be used instead of the gel electrolyte 56.

(Nonaqueous Electrolyte Battery Production Method)

This nonaqueous electrolyte battery can be fabricated as follows, for example.

Positive Electrode and Negative Electrode Production Method

The positive electrode 53 and the negative electrode 54 can be produced by the same methods as described in the second embodiment.

Assembly of Nonaqueous Electrolyte Battery

A precursor solution including an nonaqueous electrolyte solution, a polymer compound, and a mixed solvent is applied on both surfaces of each of the positive electrode 53 and the negative electrode 54, and the mixed solvent is then volatilized to form the gel electrolyte 56. Subsequently, the positive electrode lead 51 is attached to an end portion of the positive electrode current collector 53A by welding, and the negative electrode lead 52 is also attached to an end portion of the negative electrode current collector 54A by welding.

Subsequently, the positive electrode 53 and the negative electrode 54 each having the gel electrolyte 56 formed thereon are laminated with the separator 58 interposed therebetween to form a laminate, and then the laminate is wound in a longitudinal direction thereof and the protective tape 57 is adhered to an outermost peripheral portion to form the wound electrode body 50. Finally, for example, the wound electrode body 50 is interposed between the package members 60, and the outer periphery portions of the package members 60 are adhered to each other by means of heat fusion or the like, thereby enclosing the wound electrode body 50 therein. On that occasion, the contact film 61 is inserted between each of the positive electrode lead 51 and the negative electrode lead 52 and the package member 60. There is thus completed the nonaqueous electrolyte battery shown in FIGS. 7 and 8.

Alternatively, the nonaqueous electrolyte battery may be manufactured as follows. First of all, in the above-described manner, the positive electrode 53 and the negative electrode 54 are formed, and the positive electrode lead 51 and the negative electrode lead 52 are attached to the positive electrode 53 and the negative electrode 54, respectively. After that, the positive electrode 53 and the negative electrode 54 are laminated with the separator 58 interposed therebetween, the laminate is wound, and the protective tape 57 is adhered to an outermost peripheral portion, thereby forming the wound electrode body 50. Next, the wound electrode body 50 is interposed between the package members 60, the outer peripheral portions except for one side are adhered to each other by heat fusion to make a bag form, and the wound electrode body 50 is housed in the inside of the package member 60. Subsequently, an electrolyte composite including, in addition to a nonaqueous electrolyte solution, a monomer, which is a raw material of a polymer compound, a polymerization initiator, and another material such as a polymerization inhibitor as necessary is prepared and injected into the inside of the package member 60.

After the injection of the electrolyte composition, an opening of the package member 60 is hermetically sealed by heat fusion or the like under a vacuum atmosphere. Next, the monomer is heat polymerized to prepare a polymer compound, thereby forming the gel-form gel electrolyte 56, and compositing the nonaqueous electrolyte battery shown in FIGS. 7 and 8.

Further, in a case of using a nonaqueous electrolyte solution instead of the gel electrolyte 56 in the nonaqueous electrolyte battery, the positive electrode 53 and the negative electrode 54 are laminated with the separator 58 interposed therebetween, the laminate is wound, and the protective tape 57 is adhered to the outermost peripheral portion, thereby forming the wound electrode body 50. Next, the wound electrode body 50 is interposed between the package members 60, outer peripheral portions except for one side are adhered to each other by heat fusion to make a bag form, and the wound electrode body 50 is housed in the inside of the package member 60. Subsequently, the nonaqueous electrolyte solution is injected into the inside of the packaging member 60, the opening of the packaging members 60 is hermetically sealed by heat fusion under a vacuum atmosphere, thereby compositing the nonaqueous electrolyte battery.

(Other Examples of Laminated Film Type Nonaqueous Electrolyte Battery)

Although the fourth embodiment of the present technology shows the nonaqueous electrolyte battery in which the wound electrode body 50 is packaged by the package member 60, as shown in FIGS. 9A to 9C, a laminated electrode body 70 may be used instead of the wound electrode body 50. FIG. 9A is an outline drawing showing the nonaqueous electrolyte battery in which the laminated electrode body 70 is housed. FIG. 9B is an exploded perspective view showing the state where the laminated electrode body 70 is to be housed in the inside of the package member 60. FIG. 9C is an outline view showing the appearance of the nonaqueous electrolyte battery shown in FIG. 9A from the bottom surface side.

The laminated electrode body 70 that is used is produced by laminating a rectangular positive electrode 73 and a rectangular negative electrode 74 with a separator 75 interposed therebetween, and fixing the laminate with a fixing member 76. A positive electrode lead 71 connected to the positive electrode 73 and a negative electrode lead 72 connected to the negative electrode 74 are led from the laminated electrode body 70, and the contact film 61 is provided between each of the positive electrode lead 71 and the negative electrode lead 72 and the package member 60. The separator 75 is the same as in the first embodiment. A nonaqueous electrolyte solution is impregnated in the separator 75. Further, for example, a gel electrolyte layer may be formed on a surface of the positive electrode 73 and the negative electrode 74.

It is noted that the method for forming the gel electrolyte, the method for injecting the nonaqueous electrolyte solution, and the method for thermal bonding of the package member 60 are the same as those described in above.

5. Fifth Embodiment (Battery Pack Example)

Figure 10:
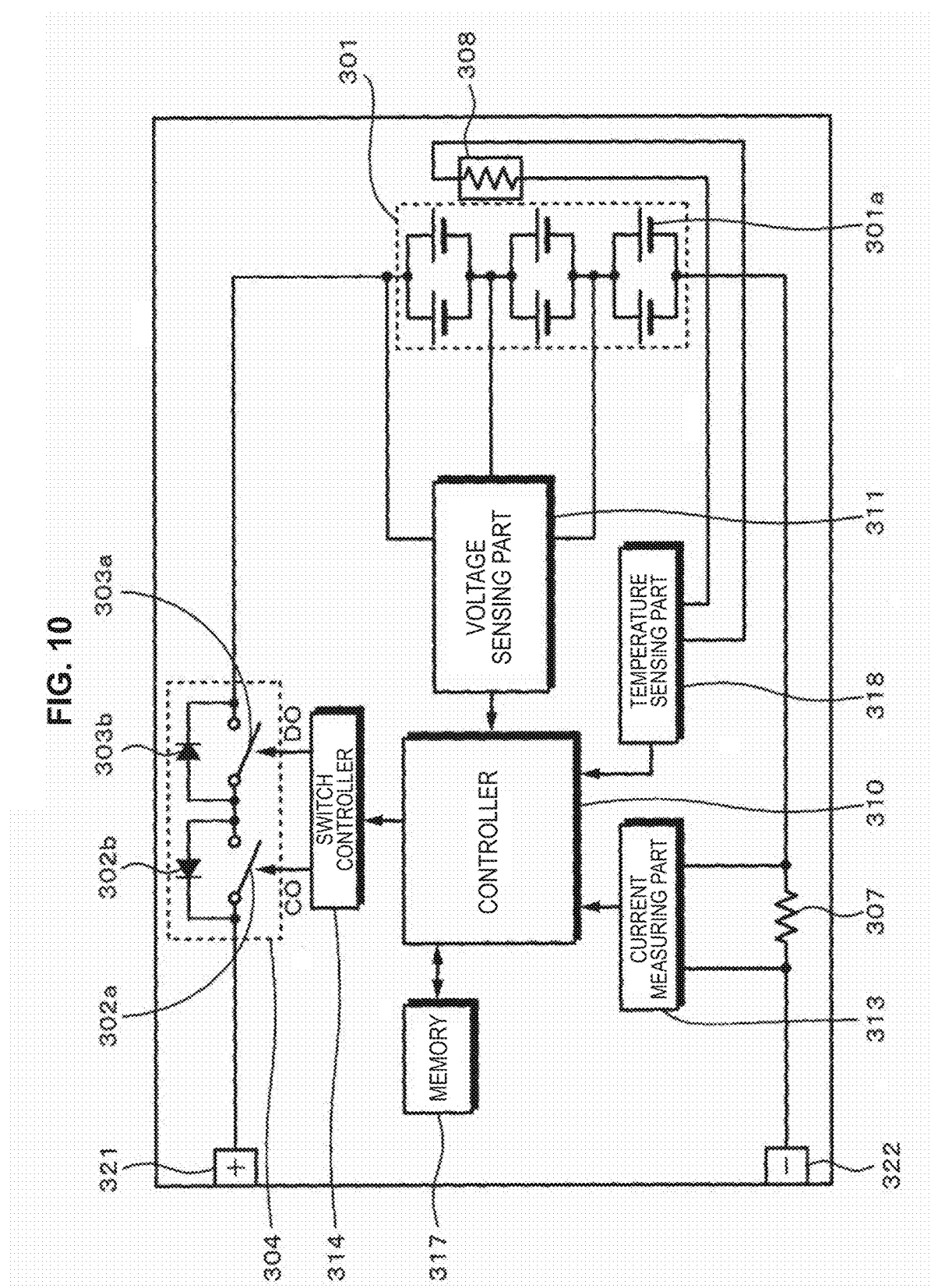
FIG. 10 is a block diagram illustrating a configuration example of a battery pack according to a fifth embodiment of the present technology.

FIG. 10 is a block diagram illustrating a circuit configuration example for a case in which a battery pack is applied in a nonaqueous electrolyte battery (hereinafter referred to as "secondary battery" as appropriate) according to the second to fourth embodiments of the present technology. The battery pack includes an assembled battery 301, a package, a switch part 304 including a charge control switch 302a and a discharge control switch 303a, a current sensing resistor 307, a temperature sensing element 308, and a controller 310.

Further, the battery pack includes a positive electrode terminal 321 and a negative electrode terminal 322, and at the time of charge, the positive electrode terminal 321 and the negative electrode terminal 322 are connected to a positive electrode terminal and a negative electrode terminal of a battery charger, respectively, and charge is performed. Further, at the time of using an electronic device, the positive electrode terminal 321 and the negative electrode terminal 322 are connected to a positive electrode terminal and a negative electrode terminal of the electronic device, respectively, and discharge is performed.

The assembled battery 301 is formed by connecting a plurality of secondary battery 301a in series and/or in parallel. Each of the secondary battery 301a is the secondary battery according to an embodiment of the present technology. Note that although FIG. 10 shows an example in which six secondary batteries 301a are connected so as to have two parallel connections and three series connections (2P3S), any other connection can be adopted such as n parallel and m series (n and m are integers) connections.

The switch part 304 includes the charge control switch 302a, a diode 302b, the discharge control switch 303a, and a diode 303b, and is controlled by the controller 310. The diode 302b has a polarity that is reverse to charge current flowing in the direction from the positive electrode terminal 321 to the assembled battery 301 and forward to discharge current flowing in the direction from the negative electrode terminal 322 to the assembled battery 301. The diode 303b has a polarity that is forward to the charge current and reverse to the discharge current. Note that although an example is shown in which the switch part is provided on a plus side, the switch part may be provided on a minus side.

The charge control switch 302a is turned off when the battery voltage is an overcharge detection voltage and is controlled by the charging and discharging controller so that charge current does not flow into a current path of the assembled battery 301. After the charge control switch is turned off, only discharge is possible via the diode 302b. Further, when overcurrent flows during charge, the charge control switch is turned off and controlled by the controller 310 so that charge current flowing in the current path of the assembled battery 301 is cut off.

The discharge control switch 303a is turned off when the battery voltage is an overdischarge detection voltage and is controlled by the controller 310 so that discharge current does not flow into the current path of the assembled battery 301. After the discharge control switch 303a is turned off, only charge is possible via the diode 303b. Further, when overcurrent flows during discharge, the discharge control switch 303a is turned off and controlled by the controller 310 so that discharge current flowing in the current path of the assembled battery 301 is cut off.

The temperature sensing element 308 is a thermistor for example, and is provided near the 301 assembled battery 301, measures the temperature of the assembled battery 301, and supplies the measured temperature to the controller 310. A voltage sensing part 311 measures the voltage of the assembled battery 301 and of each secondary battery 301a forming the assembled battery 301, A/D converts the measured voltage, and supplies the voltage to the controller 310. A current measuring part 313 measures current with the current sensing resistor 307, and supplies the measured current to the controller 310.

A switch controller 314 controls the charge control switch 302a and the discharge control switch 303a of the switch part 304, based on the voltage and current input from the voltage sensing part 311 and the current measuring part 313. When the voltage of any of the secondary batteries 301a is the overcharge detection voltage or lower or the overdischarge detection voltage or lower, or when overcurrent flows rapidly, the switch controller 314 transmits a control signal to the switch part 304 to prevent overcharge, overdischarge, and overcurrent charge/discharge.

Here, for example, if the secondary battery is a lithium ion secondary battery, the overcharge detection voltage is set at, for example, 4.20±0.05 V, and the overdischarge detection voltage is set at, for example, 2.4±0.1 V.

As a charge/discharge switch, for example, a semiconductor switch such as a MOSFET can be used. In this case, a parasitic diode of the MOSFET serves as the diodes 302b and 303b. In a case where a p-channel FET is used as the charge/discharge switch, the switch controller 314 supplies a control signal DO and a control signal CO to a gate of the charge control switch 302a and a gate of the discharge control switch 303a, respectively. In the case of the p-channel type, the charge control switch 302a and the discharge control switch 303a are turned on at a gate potential which is lower than a source potential by a predetermined value or more. That is, in normal charge and discharge operations, the charge control switch 302a and the discharge control switch 303a are made to be in an ON state by setting the control signals CO and DO to low levels.

Further, when performing overcharge or overdischarge, for example, the charge control switch 302a and the discharge control switch 303a are made to be in an OFF state by setting the control signals CO and DO to high levels.

A memory 317 is formed of a RAM or ROM, and is formed of an erasable programmable read only memory (EPROM), which is a volatile memory, for example. The memory 317 stores, in advance, the value calculated in the controller 310, the internal resistance value of the battery in an initial state of each of the secondary batteries 301a measured at a stage in a manufacturing process, and the like, which are rewritable as necessary. Further, by storing a full charge capacity of the secondary battery 301a, the memory 317 can calculate the remaining capacity together with the controller 310, for example.

A temperature sensing part 318 measures the temperature with use of the temperature sensing element 308, controls charge/discharge at the time of abnormal heat generation, and corrects the calculation of the remaining capacity.

6. Sixth Embodiment

The above-described nonaqueous electrolyte secondary battery according to the second, third, and fourth embodiments of the present technology and a battery pack that uses this according to the fifth embodiment can be mounted in or used to supply power to a device, such as an electronic device, an electric vehicle, and a power storage device.

Examples of the electronic device include a laptop personal computer, a PDA (mobile information device), a mobile phone, a cordless extension, a video movie, a digital still camera, an e-book reader, an electronic dictionary, a music player, a radio, a headphone, a game machine, a navigation system, a memory card, a pacemaker, a hearing aid, an electric tool, an electric razor, a refrigerator, an air conditioner, a television set, a stereo, a water heater, a microwave, a dishwasher, a washer, a drier, a lighting device, a toy, a medical device, a robot, a road conditioner, a traffic light, and the like.

Further, examples of the electric vehicle include a railway train, a golf cart, an electric cart, an electric car (including a hybrid car), and the like. Each battery and the battery pack 100 described in any of the second to fifth embodiments can be used as a power source for driving these vehicles or as a supplementary power source.

Examples of the power storage device include a power source for power storage for buildings such as houses or for power generation equipment, and the like.

From the above application examples, the following will show a specific example of a power storage system using the power storage device using the nonaqueous electrolyte battery according to an embodiment of the present disclosure.

This power storage system can have the following structure for example. A first power storage system is a power storage system in which the power storage device is charged with a power generation device which generates power from renewable energy. A second power storage system is a power storage system which includes the power storage device and supplies power to an electronic device connected to the power storage device. A third power storage system is an electronic device which is supplied with power from the power storage device. These power storage systems are each implemented as a system to supply power efficiently in association with an external power supply network.

Further, a fourth power storage system is an electric vehicle including a conversion device which converts power supplied from the power storage device to driving power of a vehicle, and a control device which performs information processing about vehicle control based on information about the power storage device. A fifth power storage system is a power system including a power information transmitting/receiving part which transmits/receives signals to/from other devices via a network, and controls charge/discharge of the power storage device based on information received by the transmitting/receiving part. A sixth power storage system is a power system which enables power supply from the power storage device and power supply to the power storage device from a power generation device or a power network. The following will show the power storage system.

(6-1) Home Power Storage System as Application Example

Figure 11:
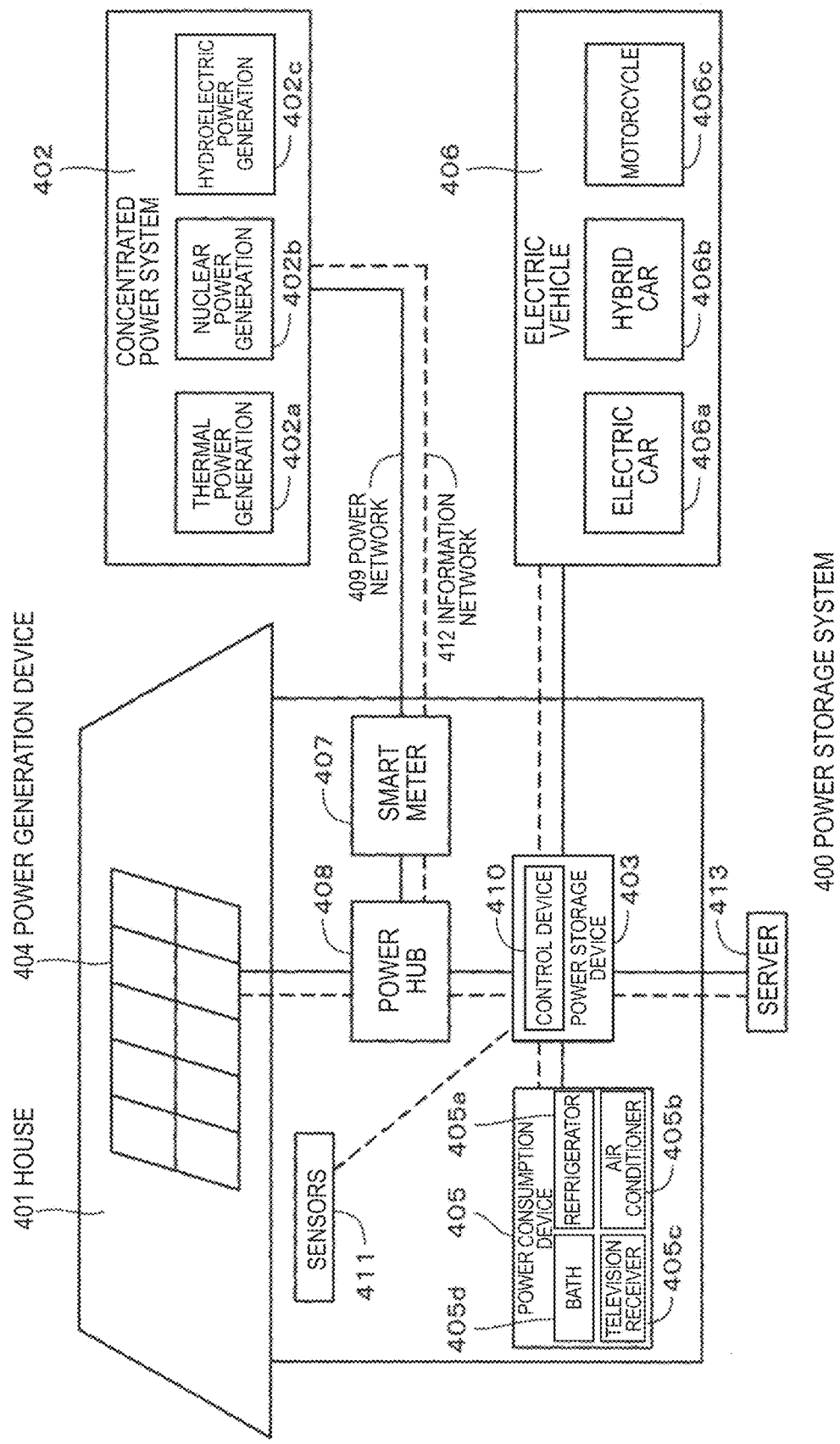
FIG. 11 is a schematic diagram illustrating an example in which a nonaqueous electrolyte battery according to the present technology is applied in a home power storage system.

An example in which the power storage device using the nonaqueous electrolyte battery according to the present disclosure is used for a home power storage system will be described with reference to FIG. 11. For example, in a power storage system 400 for a house 401, power is supplied to the power storage device 403 from a concentrated power system 402 including thermal power generation 402a, nuclear power generation 402b, hydroelectric power generation 402c, and the like, via a power network 409, an information network 412, a smart meter 407, a power hub 408, and the like. Further, power is supplied to the power storage device 403 from an independent power source such as a home power generation device 404. Power supplied to the power storage device 403 is stored, and power to be used in the house 401 is fed with use of the power storage device 403. The same power storage system can be used not only in the house 401 but also in a building.

The house 401 is provided with the power generation device 404, a power consumption device 405, the power storage device 403, a control device 410 which controls each device, the smart meter 407, and sensors 411 which acquires various pieces of information. The devices are connected to each other by the power network 409 and the information network 412. As the power generation device 404, a solar cell, a fuel cell, or the like is used, and generated power is supplied to the power consumption device 405 and/or the power storage device 403. Examples of the power consumption device 405 include a refrigerator 405a, an air conditioner 405b, a television receiver 405c, a bath 405d, and the like. Examples of the power consumption device 405 further include an electric vehicle 406 such as an electric car 406a, a hybrid car 406b, or a motorcycle 406c.

For the power storage device 403, the nonaqueous electrolyte battery according to an embodiment of the present disclosure is used. The nonaqueous electrolyte battery according to an embodiment of the present disclosure may be formed of the above-described lithium ion secondary battery for example. Functions of the smart meter 407 include measuring the used amount of commercial power and transmitting the measured used amount to a power company. The power network 409 may be any one or more of DC power supply, AC power supply, and contactless power supply.

Examples of the various sensors 411 include a motion sensor, an illumination sensor, an object detecting sensor, a power consumption sensor, a vibration sensor, a touch sensor, a temperature sensor, an infrared sensor, and the like. Information acquired by the various sensors 411 is transmitted to the control device 410. With the information from the sensors 411, weather conditions, people conditions, and the like are caught, and the power consumption device 405 is automatically controlled so as to make the energy consumption minimum. Further, the control device 410 can transmit information about the house 401 to an external power company via the Internet, for example.

The power hub 408 performs processes such as branching off power lines and DC/AC conversion. Examples of communication schemes of the information network 412 connected to the control device 410 include a method using a communication interface such as UART (Universal Asynchronous Receiver/Transceiver), and a method using a sensor network according to a wireless communication standard such as Bluetooth, ZigBee, or Wi-Fi. A Bluetooth scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 410 is connected to an external server 413. The server 413 may be managed by any of the house 401, an electric company, and a service provider. Examples of information transmitted and received by the server 413 include power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the PDA (Personal Digital Assistant).

The control device 410 controlling each part is configured with a CPU (Central Processing Unit), a RAM (Random Access Memory), a ROM (Read Only Memory), and the like, and is stored in the power storage device 403 in this example. The control device 410 is connected to the power storage device 403, the home power generation device 404, the power consumption device 405, the various sensors 411, and the server 413 via the information network 412, and has a function of adjusting the used amount of commercial power and the power generation amount, for example. Note that the control device 410 may further have a function of performing power trade in the power market.

As described above, power generated by not only the concentrated power system 402 such as the thermal power generation 402a, the nuclear power generation 402b, and the hydroelectric power generation 402c, but also the home power generation device 404 (solar power generation or wind power generation) can be stored in the power storage device 403. Therefore, even when the power generated by the home power generation device 404 varies, the amount of power supplied to the outside can be constant, or only necessary discharge can be controlled. For example, power generated by the solar power generation can be stored in the power storage device 403 and also inexpensive power at midnight can be stored in the power storage device 403 during nighttime, so that power stored in the power storage device 403 can be discharged and used when the power fee is expensive during daytime.

Note that although this example shows the control device 410 housed in the inside of the power storage device 403, the control device 410 may be housed in the inside of the smart meter 407 or configured independently. Further, the power storage system 400 may be used for a plurality of houses in a multiple dwelling house or a plurality of separate houses.

(6-2) Power Storage System in Vehicle as Application Example

Figure 12:
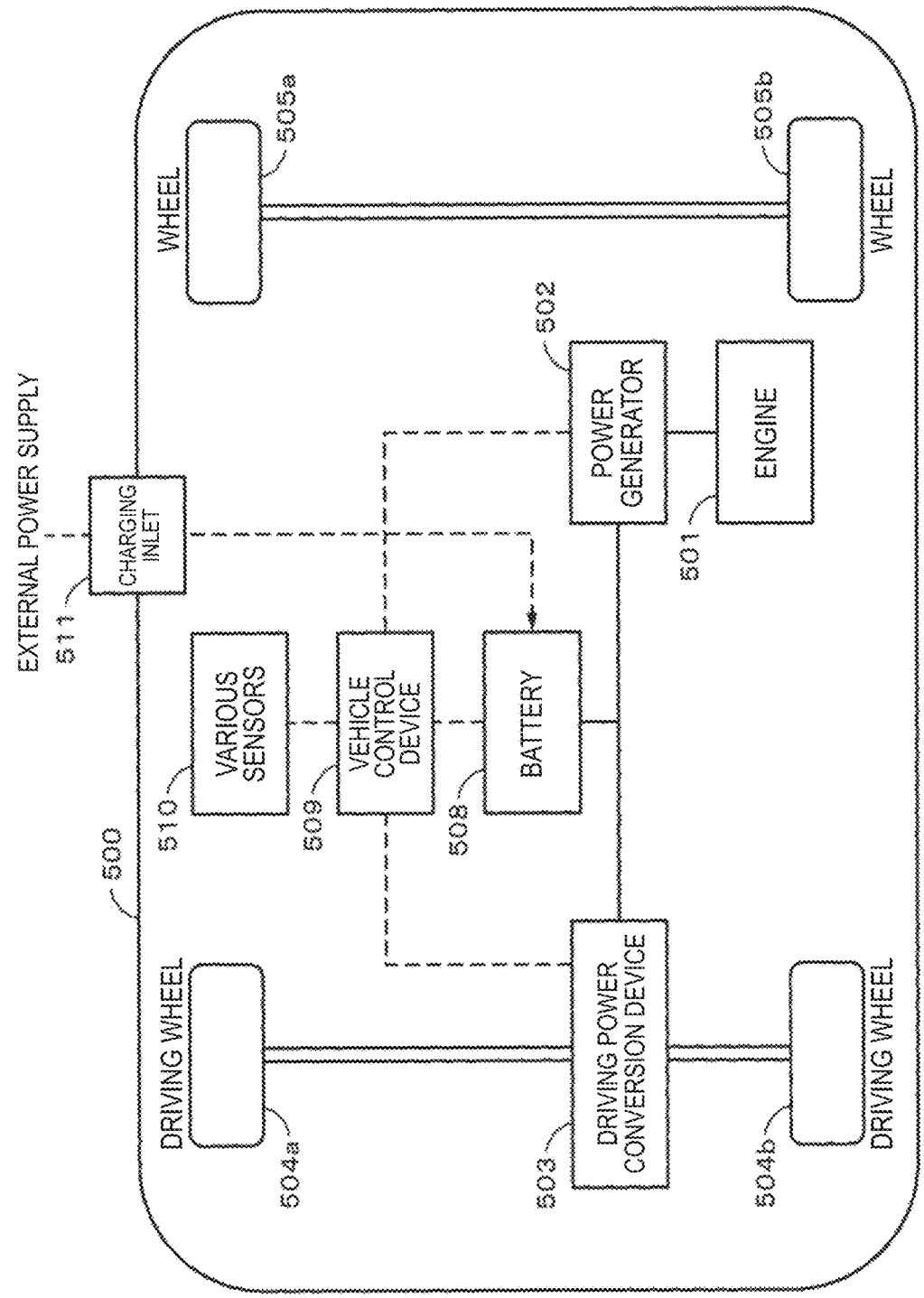
FIG. 12 is a schematic diagram schematically illustrating an example of a configuration of a hybrid vehicle that employs a series hybrid system in which the present technology is applied.

An example in which an embodiment of the present technology is applied to a power storage system for vehicles will be described with reference to FIG. 12. FIG. 12 schematically shows an example of a structure of a hybrid vehicle employing a series hybrid system to which an embodiment of the present technology is applied. The series hybrid system is a car which runs with a driving power conversion device using power generated by a power generator driven by an engine or power obtained by storing the power in a battery.

A hybrid vehicle 500 incorporates an engine 501, a power generator 502, a driving power conversion device 503, driving wheels 504a and 504b, wheels 505a and 505b, a battery 508, a vehicle control device 509, various sensors 510, and a charging inlet 511. For the battery 508, the nonaqueous electrolyte battery according to the present technology is used.

The hybrid vehicle 500 runs by using the driving power conversion device 503 as a power source. One of examples of the driving power conversion device 503 is a motor. Power in the battery 508 drives the driving power conversion device 503, and the rotating power of the driving power conversion device 503 is transmitted to the driving wheels 504a and 504b. Note that by using DC/AC conversion or AC/DC conversion in a necessary portion, an alternate current motor or a direct current motor can be used for the driving power conversion device 503. The various sensors 510 control the number of engine rotation via the vehicle control device 509 and controls the aperture of an unshown throttle valve (throttle aperture). The various sensors 510 include a speed sensor, an acceleration sensor, a sensor of the number of engine rotation, and the like.

The rotating power of the engine 501 is transmitted to the power generator 502, and power generated by the power generator 502 with the rotating power can be stored in the battery 508.

When the hybrid vehicle 500 reduces the speed with an unshown brake mechanism, the resisting power at the time of the speed reduction is added to the driving power conversion device 503 as the rotating power, and regenerative power generated by the driving power conversion device 503 with this rotating power is stored in the battery 508.

The battery 508 can be connected to an external power source of the hybrid vehicle 500, and accordingly, power can be supplied from the external power source by using the charging inlet 511 as an input inlet, and the received power can be stored.

Although not shown, an information processing device which performs information processing about vehicle control based on information about the secondary battery may be provided. Examples of such an information processing device include an information processing device which displays the remaining battery based on information about the remaining battery.

Note that the above description is made by taking an example of the series hybrid car which runs with a motor using power generated by a power generator driven by an engine or power obtained by storing the power in a battery. However, an embodiment of the present technology can also be applied effectively to a parallel hybrid car which uses the output of an engine and a motor as the driving power source and switches three modes as appropriate: driving with the engine only; driving with the motor only; and driving with the engine and the motor. Further, an embodiment of the present technology can also be applied effectively to a so-called electric vehicle which runs by being driven with a driving motor only, without an engine.

EXAMPLES

Although the present technology will now be described in detail based on the following examples, the composition of the present technology is not limited to just these examples.

Example 1-1

(Separator Production)
(Resin Solution Preparation)

First, alumina with an average particle size of 0.5 µm, boehmite with an average particle size of 6.0 µm, and polyvinylidene fluoride were mixed in a mass ratio of 76:14:10. The mixture was then dispersed in N-methyl-2-pyrrolidone to prepare a resin solution (paint). It is noted that average particle size was the D50 measured as follows. Namely, the measurement was carried out using a laser refraction-type particle size distribution measuring apparatus ("SALD 7100", manufactured by Shimadzu Corporation). N-methyl-2-pyrrolidone was used as the dispersion medium, and polyvinylidene fluoride was used as the dispersion agent. It is noted that the D50 represents the average particle diameter (µm) of a cumulative total of 50% by volume calculated from the smaller particles in a particle size distribution obtained by laser refraction.

(Surface Layer Formation)

A 12 µm-thick polyethylene (PE) porous film was used as the substrate. The above-described paint was coated on both faces of this substrate by adjusting the coating amount so that the density of the convexities was 700 per mm². The coated substrate was dipped in a congealing solution formed from water, and then dried to form a porous surface layer. In this manner, the separator was produced.

(SEM Observation)

The surface of Example 1-1 was observed with an SEM (a scanning electron microscope). The SEM observation was carried out using the electron microscope S-4800, manufactured by Hitachi High-Technologies Corporation. The SEM observation was carried out at three different magnifications. FIG. 13A illustrates an SEM image of a surface layer observed at 500 times magnification. FIG. 13B illustrates an SEM image of a surface layer observed at 5,000 times magnification. FIG. 13C illustrates an SEM image of a surface layer observed at 10,000 times magnification.

As illustrated in FIGS. 13A and 13B, an uneven shape is formed on the surface layer. First particles (boehmite) are covered by second particles (alumina) that have a smaller average particle size than the first particles. Convexities are formed from the first particles (boehmite) and second particles (alumina) As illustrated in FIG. 13C, tiny voids are formed on the surface layer that is formed only by the second particles (alumina) where convexities are not formed.

Example 1-2

A separator was produced in the same manner as in Example 1-1, except that boehmite having an average particle size of 9.5 µm was used instead of boehmite having an average particle size of 6.0 µm. Further, using this separator, a cylindrical battery was fabricated as follows.

(Production of Positive Electrode)

A positive electrode mixture was prepared by mixing 91% by mass of lithium cobalt oxide ($LiCoO_2$), which is a positive electrode active material, 6% by mass of carbon black, which is a conducting agent, and 3% by mass of polyvinylidene fluoride (PVdF), which is a binder. This positive electrode mixture was dispersed in N-methyl-2-pyrrolidone (NMP), which is a dispersion medium, to produce a positive electrode mixture slurry. This positive electrode mixture slurry was coated on both faces of a positive electrode current collector formed from a 15 µm-thick strip of aluminum foil so that a portion of the positive electrode current collector was exposed. The dispersion medium of the positive electrode mixture slurry was then volatilized and dried off, and the resultant product was compression-molded with a roll press or the like to form a positive electrode active material layer. Lastly, a positive electrode terminal was attached to the exposed portion of the positive electrode current collector to form the positive electrode.

(Production of Negative Electrode)

First, a negative electrode active material was obtained by obtaining a silicon material ($SiO_x$) (core section) by a gas atomizing method, and then depositing on the surface of the core section a silicon material ($SiO_y$) (coated section) having a lower crystallinity than the core portion by a powder deposition method. At the core section, the half width was 0.6°, the crystallite size was 90 µm, and the average particle size was 4 µm. At the coated section, the average thickness was 500 µm and the average coverage was 70%.

It is noted that when forming the core section silicon material ($SiO_x$), the composition (oxidation state) was controlled by adjusting the amount of oxygen introduced during the melting and agglomeration of the raw material (silicon). When forming the coated section silicon material ($SiO_y$), the composition was controlled by adjusting the amount of oxygen or hydrogen introduced during the deposition of the raw material (silicon). In the powder deposition method, a deflected electron beam deposition source was used, the deposition rate set at 2 nm/second, and a vacuum state set at a pressure of $1 \times 10^{-3}$ with a turbo molecular pump.

A negative electrode mixture was prepared by mixing 80% by mass of a silicon material, which is a negative electrode active material, and 20% by mass (dry mass ratio) of a polyamic acid solution, which is a polyimide precursor that serves as a binder. This negative electrode mixture was dispersed in N-methyl-2-pyrrolidone (NMP), which is a dispersion medium, to produce a negative electrode mixture slurry. It is noted that as the solvent of the polyamic acid solution, NMP and N,N-dimethylacetamide (DMAC) were used. This negative electrode mixture slurry was coated on both faces of a negative electrode current collector formed from a 15 µm-thick strip of copper foil so that a portion of the negative electrode current collector was exposed. The dispersion medium of the negative electrode mixture slurry was then volatilized and dried off, the resultant product was compression-molded with a roll press or the like, and then baked for 1 hour in a 400° C. vacuum atmosphere to produce the polyimide that serves as a binder, thereby forming a negative electrode active material layer. Lastly, a negative electrode terminal was attached to the exposed portion of the negative electrode current collector to form the negative electrode.

(Preparation of Nonaqueous Electrolyte Solution)

A nonaqueous electrolyte solution was prepared by dissolving lithium hexafluorophosphate ($LiPF_6$) as an electrolyte salt in a concentration of 1 mol/dm³ in a nonaqueous solvent obtained by mixing ethylene carbonate (EC), vinylene carbonate (VC), and diethyl carbonate (DEC) in a mass ratio of EC:DEC:VC=30:60:10.

(Assembly of Cylindrical Battery)

A wound electrode body was formed by laminating the positive electrode, the negative electrode and the separator in order of positive electrode, separator, negative electrode, and separator, winding the resultant laminate multiple times in the longitudinal direction, and fixing the portion that had finished being wound with adhesive tape. At this point, the separator surface layer having an uneven shape was arranged opposing the negative electrode. Next, the positive electrode terminal was joined to a safety valve that was joined to the battery cap, and the negative electrode lead was connected to the negative electrode can. The wound electrode body was sandwiched between a pair of insulating plates, and housed inside the battery can. A center pin was then inserted into the center of the wound electrode body.

Next, the nonaqueous electrolyte solution was injected from above the insulating plates into the cylindrical battery can. Lastly, the open end portion of the battery can was sealed by caulking a safety mechanism configured from a safety valve, a disc holder, and a cutting-off disc, the PTC element, and the battery cap via an insulating sealing gasket. Consequently, the cylindrical battery illustrated in FIG. 4 having a battery shape with a diameter of 18 mm, a height of 65 mm (ICR 18650 size), and a battery capacity of 3,500 mAh was fabricated.

(SEM Observation Before and After Charging and Discharging)

The fabricated battery was charged at a constant current in a 23° C. atmosphere until the battery voltage reached 4.2

Figure 14:
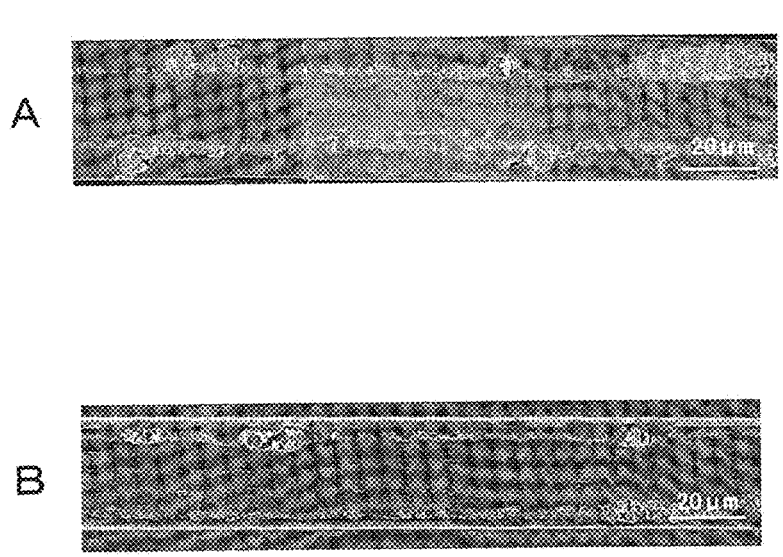
FIG. 14A illustrates an SEM image showing a cross-section of an electrode and a separator before charging.
FIG. 14B illustrates an SEM image showing a cross-section of an electrode and a separator after charging.

V at a charging current of 0.5 C. The battery was then charged at a constant voltage at a battery voltage of 4.2 V. The charging was stopped when the charging current reached 50 mA. Constant-current discharge was then carried out at a discharge current of 0.5 C until the battery voltage reached 2.5 V. A cross-section of the separator before and after charging was observed with an SEM. The SEM observation was carried out using the electron microscope S-4800, manufactured by Hitachi High-Technologies Corporation. The SEM observation was carried out at three different magnifications. FIG. 14A illustrates an SEM image showing a cross-section of the separator before charging, and FIG. 14B illustrates an SEM image showing a cross-section of the separator after charging. It is noted that in each of FIGS. 14A and 14B, the top is the negative electrode side, and the bottom is the positive electrode side.

As illustrated in FIG. 14A, before expansion, the convexities of the surface layer abut the electrode, so that a space is formed between the electrode and the separator corresponding to the concavities. As illustrated in FIG. 14B, it can be confirmed that after expansion, the expansion in the volume of the negative electrode is absorbed by the space corresponding to the concavities between the electrode and the separator. Further, stress from the expansion of the negative electrode is concentrated at the convexities, partially causing the substrate to crumple.

Example 2-1

(Separator Production)
(Resin Solution Preparation)
First, alumina particles with an average particle size of 0.5 μm, boehmite particles with an average particle size of 9.5 μm, and polyvinylidene fluoride were mixed in a mass ratio of 72:18:10. The mixture was then dispersed in N-methyl-2-pyrrolidone to prepare a resin solution (paint).
(Surface Layer Formation)
A 12 μm-thick polyethylene (PE) porous film was used as the substrate. The above-described paint was coated on both faces of this substrate by adjusting the coating amount so that the density of the convexities was 900 per mm$^2$. The coated substrate was dipped in a congealing solution formed from water, and then dried to form a porous surface layer.

In this manner, the separator was produced. Further, a cylindrical battery was fabricated using this separator in the same manner as in Example 1-2.

Example 2-2

A separator was produced in the same manner as in Example 2-1, except that during the preparation of the resin solution, boehmite particles having an average particle size of 6.0 μm were used instead of boehmite particles having an average particle size of 9.5 μm. Further, using this separator, a cylindrical battery was fabricated in the same manner as in Example 1-2.

Comparative Example 2-1

A separator was produced in the same manner as in Example 2-1, except that during the preparation of the resin solution, alumina particles having an average particle size of 0.5 μm were not used, alumina particles having an average particle size of 3.0 μm were used instead of boehmite particles having an average particle size of 9.5 μm, and the mass ratio of the alumina particles having an average particle size of 3.0 μm and the polyvinylidene fluoride was 90:10. The coating amount was the same as in Example 2-1. Further, using this separator, a cylindrical battery was fabricated in the same manner as in Example 1-2.

Comparative Example 2-2

A separator was produced in the same manner as in Example 2-1, except that during the preparation of the resin solution, boehmite particles having an average particle size of 9.5 μm were not used, and the mass ratio of the alumina particles having an average particle size of 0.5 μm and the polyvinylidene fluoride was 90:10. The coating amount was the same as in Example 2-1. Further, using this separator, a cylindrical battery was fabricated in the same manner as in Example 1-2.

Comparative Example 2-3

The separator of Comparative Example 2-3 was formed from a substrate (a 12 μm-thick polyethylene (PE) porous film), without forming a surface layer. Further, using this separator, a cylindrical battery was fabricated in the same manner as in Example 1-2.
(Evaluation)
Examples 2-1 to 2-3 and Comparative Examples 2-1 to 2-3 were subjected to "measurement of surface roughness Ra", "measurement of surface layer thickness", "measurement of thickness of surface layer formed by second particles", and "measurement of surface layer porosity".
(Measurement of Surface Layer Roughness Ra)
The surface roughness Ra of the surface layer (arithmetic mean roughness) was measured using a laser microscope (Trade name: VK-9500, manufactured by Keyence Corporation). During this operation, the measured range was 210 μm×280 μm.
(Measurement of Surface Layer Thickness)
The surface layer has an uneven shape, it does not have a uniform thickness. Consequently, the thickness T of the surface layer was taken as the thickness per single side obtained by subtracting the thickness of the substrate (12 μm) from the thickness when a 1.8 kg/cm$^2$ load was placed on the separator using a round, flat indenter having a diameter of 6 mm. Further, the above measurement was repeated ten times, and the average value was calculated. This average value was taken as the surface layer thickness.
(Measurement of Concavity-Convexity Height Difference of Uneven Shape)
The concavity-convexity height difference of the surface layer was measured using a laser microscope (Trade name: VK-9500, manufactured by Keyence Corporation). During this operation, the measured range was 210 μm×280 μm. It is noted that since the concavity-convexity height difference is variable, the concavity-convexity height difference at ten points was measured and the average value thereof taken as the concavity-convexity height difference.
(Measurement of Thickness of Surface Layer Formed by Second Particles)
The surface layer of the produced separator was peeled off with tape, and the step difference between a coated portion and an uncoated portion of the produced surface layer was measured using a laser microscope (Trade name: VK-9500, manufactured by Keyence Corporation). The step difference between the substrate and the surface layer formed by the second particles was taken as the thickness of the surface layer formed by the second particles.

(Measurement of Surface Layer Porosity)

The porosity of the surface layer was determined as follows. First, a sample was formed by cutting the separator into a cutout size S (cm²), and the mass (W1 (g)) of this sample and the thickness (D (cm)) of the surface layer were measured. To measure the mass of the sample, electronic scales (Trade name: AUW220D, manufactured by Shimadzu Corporation) were used. Next, the mass of the substrate, which had been measured in advance, was subtracted from the mass (W1 (g)) of the sample to calculate the mass (W2 (g)) of the surface layer. It is noted that to measure the substrate mass the same apparatus as used to measure the mass of the sample was used. Next, the mass (Wi (g), i=1, 2, . . . n) of the type i (i=1, 2, . . . n) of material constituting the surface layer was determined by calculating from the composition. Then, porosity was calculated from the following equation by dividing the mass (Wi (g)) of each material by its true density (di (g/cm³)) and assuming the volume of each material.

Porosity (%)=100−{(mass $W1$/true density $d1$)+(mass $W2$/true density $d2$)+ . . . +(mass $Wn$/true density $dn$)}/(cutout size×thickness $D$)

(Evaluation of Foil Tear)

The cylindrical batteries fabricated in each of the examples and comparative examples were charged at a constant current until the battery voltage reached 4.2 V at a charging current of 0.5 C. The batteries were then charged at a constant voltage at a battery voltage of 4.2 V. The charging was stopped when the charging current reached 50 mA. The cylindrical batteries were then disassembled, and the presence of electrode tear was visually confirmed. The above process was carried out on 10 samples of each of the examples and comparative examples, and tear suppression effects were evaluated based on the following criteria.
Of the 10 samples, no foil tear occurred in any of the 10 samples Double circle
Of the 10 samples, foil tear occurred in from 1 to 9 of the 10 samples Circle
Of the 10 samples, foil tear occurred in all 10 of the 10 samples Cross The evaluation results for Examples 2-1 and 2-2 and Comparative Examples 2-1 to 2-3 are shown in Table 1.

formed just from alumina particles on the substrate, so that although a surface layer having a high porosity was formed, since the convexity density was too high and the concavity-convexity height difference of the uneven shape was small, there was almost no space for absorbing negative electrode expansion, so that foil tear could not be prevented. Further, since the surface roughness Ra in Comparative Example 2-1 was the same as in Example 2-1, it can be seen that just with surface roughness absorption of the expansion of the negative electrode is insufficient. According to Comparative Example 2-1, since the expansion of the negative electrode could not be absorbed just by forming the surface layer with alumina particles on the substrate, foil tear could not be suppressed. According to Comparative Example 2-3, when the substrate was used as is, the expansion of the negative electrode could not be absorbed, and foil tear could not be suppressed.

Example 3-1

(Separator Production)
(Resin Solution Preparation)

First, alumina particles with an average particle size of 0.5 μm, boehmite particles with an average particle size of 6.0 μm, and polyvinylidene fluoride were mixed in a mass ratio of 76:14:10. The mixture was then dispersed in N-methyl-2-pyrrolidone to prepare a resin solution (paint).

(Surface Layer Formation)

A 12 μm-thick polyethylene (PE) porous film was used as the substrate. The above-described paint was coated on both faces of this substrate by adjusting the coating amount so that the thickness of the surface layer formed by alumina particles was 2.0 μm. The coated substrate was dipped in a congealing solution formed from water, and then dried to form a porous surface layer. It is noted that the thickness of the surface layer formed from alumina particles is for each side.

In this manner, the separator was produced. Further, a cylindrical battery was fabricated using this separator in the same manner as in Example 1-2.

Example 3-2

A separator was produced in the same manner as in Example 3-1, except that the paint was coated on both faces

TABLE 1

| | Substrate | | First Particles | | Second Particles | | Surface Roughness Ra (μm) | Surface Layer Thickness (μm) | Concavity-Convexity Height Difference (μm) | Thickness of Surface Layer Formed by Second Particles (μm) | Surface Layer Porosity (%) | Foil Tear |
|---|---|---|---|---|---|---|---|---|---|---|---|---|
| | Type | Thickness (μm) | Type | Average Particle Size (μm) | Type | Average Particle Size (μm) | | | | | | |
| Example 2-1 | PE | 12 | Boehmite | 9.5 | Alumina | 0.5 | 0.70 | 8.0 | 6.0 | 2.0 | 84.5 | ⊚ |
| Example 2-2 | PE | 12 | Boehmite | 6.0 | Alumina | 0.5 | 0.60 | 5.0 | 2.0 | 3.0 | 80.7 | ⊚ |
| Comparative Example 2-1 | PE | 12 | Alumina | 3.0 | — | — | 0.71 | 8.0 | 1.5 | — | 76.0 | X |
| Comparative Example 2-2 | PE | 12 | — | — | Alumina | 0.5 | 0.20 | 2.0 | — | 2.0 | 58.0 | X |
| Comparative Example 2-3 | PE | 12 | — | — | — | — | 0.12 | — | — | — | — | X |

As illustrated in Table 1, according to Examples 2-1 and 2-2, expansion of the negative electrode could be absorbed by the surface layer having an uneven shape formed from first particles (boehmite) and second particles (alumina), and foil tear could be resolved. On the other hand, according to Comparative Example 2-1, concavities and convexities were of the substrate by adjusting the coating amount so that the thickness of the surface layer formed from alumina particles was 1.5 μm. Further, using this separator, a cylindrical battery was fabricated in the same manner as in Example 1-2.

Example 3-3

A separator was produced in the same manner as in Example 3-1, except that the paint was coated on both faces of the substrate by adjusting the coating amount so that the thickness of the surface layer formed from alumina particles was 1.0 μm. Further, using this separator, a cylindrical battery was fabricated in the same manner as in Example 1-2.

Comparative Example 3-1

The separator of Comparative Example 3-1 was formed from a substrate (a 12 μm-thick polyethylene (PE) porous film), without forming a surface layer. Further, using this separator, a cylindrical battery was fabricated in the same manner as in Example 1-2.

Comparative Example 3-2

A separator was produced in the same manner as in Example 3-1, except that during the preparation of the resin solution, alumina particles having an average particle size of 0.5 μm were not used, and the mass ratio of the boehmite particles having an average particle size of 6.0 μm and the polyvinylidene fluoride was 90:10. The coating amount was the same as in Example 3-1. Further, using this separator, a cylindrical battery was fabricated in the same manner as in Example 1-2.

(Evaluation)

Examples 3-1 to 3-3 and Comparative Examples 3-1 and 3-2 were subjected in the following manner to "measurement of surface layer thickness", "measurement of thickness of surface layer formed by second particles", "measurement of contraction ratio", "evaluation of oxidation resistance", and "evaluation of stripping resistance".

(Measurement of Surface Layer Thickness)

The thickness of the surface layer was measured in the same manner as described above.

(Measurement of Thickness of Surface Layer Formed by Second Particles)

The thickness of the surface layer formed by second particles was measured in the same manner as described above.

(Measurement of Contraction Ratio After High-Temperature Storage)

The separators of each of the examples and the comparative examples were cut 60 mm in a MD (machine direction) and 60 mm in a TD (transverse direction), and left for 1 hour in a 150° C. oven. At this stage, the separators were left to stand while sandwiched between two sheets of paper so that hot air would not directly hit them. The separators were then removed from the oven, cooled, and the length (mm) in the MD direction and in the TD direction, respectively, was measured. The thermal contraction ratio in the MD direction and in the TD direction was calculated from the following formulae.

$$\text{MD Contraction Ratio (\%)} = (60 - \text{MD direction length of microporous film after heating})/60 \times 100$$

$$\text{TD Contraction Ratio (\%)} = (60 - \text{TD direction length of microporous film after heating})/60 \times 100$$

(Evaluation of Oxidation Resistance)

Oxidation resistance was evaluated by observing the surface layer of the separators with the electron microscope S-4800, manufactured by Hitachi High-Technologies Corporation. Specifically, SEM observation of a predetermined range (250 μm×100 μm) was performed at 10 random locations on the surface layer, and oxidation resistance was evaluated based on the following criteria.

Substrate surface was not exposed at any locations Double circle

Substrate surface was exposed at one or more locations Circle

Substrate surface was exposed at all locations Cross (Stripping Resistance Evaluation)

Figure 15:
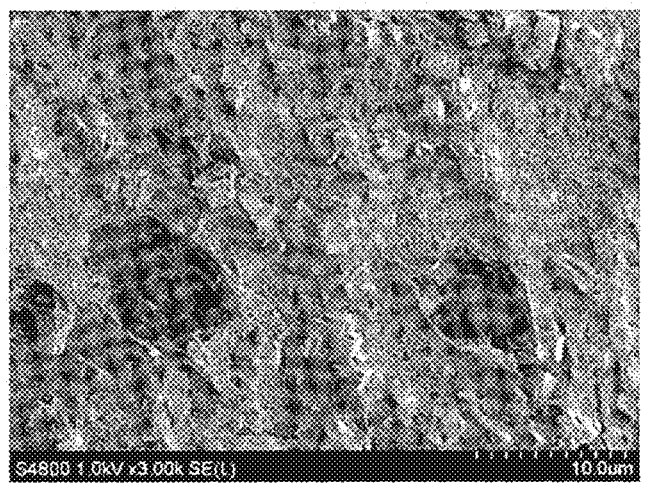
FIG. 15 illustrates an SEM image observing a state in which first particles have been stripped away.

The surface layer of the separators was observed with the electron microscope S-4800, manufactured by Hitachi High-Technologies Corporation. Separators in which stripping of the first particles could not be confirmed were evaluated as a "circle", and separators in which stripping of the first particles could be confirmed were evaluated as a "cross". It is noted that FIG. 15 illustrates an SEM image of Comparative Example 3-2 in which the stripped state of the first particles was observed.

The evaluation results for Examples 3-1 to 3-3 and Comparative Examples 3-1 and 3-2 are shown in Table 2.

TABLE 2

| | Substrate | | First Particles | | Second Particles | | Surface Layer Thickness (μm) | Thickness of Surface Layer Formed by Second Particles (μm) | Contraction Ratio (%) | | Oxidation Resistance | Stripping Resistance |
| | Type | Thickness (μm) | Type | Average Particle Size (μm) | Type | Average Particle Size (μm) | | | MD Direction | TD Direction | | |
|---|---|---|---|---|---|---|---|---|---|---|---|---|
| Example 3-1 | PE | 12 | Boehmite | 6.0 | Alumina | 0.5 | 5.0 | 2.0 | 24 | 21 | ◎ | ○ |
| Example 3-2 | PE | 12 | Boehmite | 6.0 | Alumina | 0.5 | 5.0 | 1.5 | 27 | 22 | ◎ | ○ |
| Example 3-3 | PE | 12 | Boehmite | 6.0 | Alumina | 0.5 | 5.0 | 1.0 | 38 | 32 | ○ | ○ |
| Comparative Example 3-1 | PE | 12 | — | — | — | — | — | — | 75 | 70 | X | — |
| Comparative Example 3-2 | PE | 12 | Boehmite | 6.0 | — | — | 5.0 | — | 48 | 36 | X | X |

As illustrated in FIG. 2, according to Examples 3-1 to 3-3, oxidation resistance was better than in Comparative Example 3-2, which was formed just from boehmite particles (first particles). Further, according to Examples 3-1 to 3-3, heat resistance was better than in Comparative Example 3-2, which was formed just from boehmite particles (first particles). In Comparative Example 3-1, neither heat resistance nor oxidation resistance could be obtained with just the substrate. Further, according to Examples 3-1 to 3-3, when the thickness of the surface layer formed only by second particles was 1.5 μm or more, since the surface layer formed only by second particles could be uniformly formed, oxidation resistance was further improved. On the other hand, when the surface layer formed by second particles was 1.0 μm, since the substrate was exposed because the surface layer formed by second particles could not be uniformly formed, oxidation resistance was reduced. Further, according to Examples 3-1 to 3-3, stripping resistance was better than in Comparative Example 3-2, which was formed only from first particles, due to the formation of a surface layer from first particles and second particles.

Example 4-1

(Separator Production)
(Resin Solution Preparation)

First, alumina particles with an average particle size of 0.5 μm, boehmite particles with an average particle size of 6.0 μm, and polyvinylidene fluoride were mixed in a mass ratio of 89:1:10. The mixture was then dispersed in N-methyl-2-pyrrolidone to prepare a resin solution (paint).

(Surface Layer Formation)

A 12 μm-thick polyethylene (PE) porous film was used as the substrate. The above-described paint was coated on one face of this substrate by adjusting the coating amount so that the density of the convexities was 100. The coated substrate was dipped in a congealing solution formed from water, and then dried to form a porous surface layer.

In this manner, the separator was produced. Further, a cylindrical battery was fabricated using this separator in the same manner as in Example 1-2.

Example 4-2

A separator was produced in the same manner as in Example 4-1, except that during the preparation of the resin solution, the mass ratio among the alumina particles having an average particle size of 0.5 μm, the boehmite particles having an average particle size of 6.0 μm, and the polyvinylidene fluoride was changed to 85:5:10, and the paint was coated on one face of the substrate by adjusting the coating amount so that the density of the convexities was 200 (per mm$^2$) Further, using this separator, a cylindrical battery was fabricated in the same manner as in Example 1-2.

Example 4-3

A separator was produced in the same manner as in Example 4-1, except that during the preparation of the resin solution, the mass ratio among the alumina particles having an average particle size of 0.5 μm, the boehmite particles having an average particle size of 6.0 μm, and the polyvinylidene fluoride was changed to 81:9:10, and the paint was coated on one face of the substrate by adjusting the coating amount so that the density of the convexities was 300 (per mm$^2$) Further, using this separator, a cylindrical battery was fabricated in the same manner as in Example 1-2.

Example 4-4

A separator was produced in the same manner as in Example 4-1, except that during the preparation of the resin solution, the mass ratio among the alumina particles having an average particle size of 0.5 μm, the boehmite particles having an average particle size of 6.0 μm, and the polyvinylidene fluoride was changed to 76:14:10, and the paint was coated on one face of the substrate by adjusting the coating amount so that the density of the convexities was 700 (per mm$^2$) Further, using this separator, a cylindrical battery was fabricated in the same manner as in Example 1-2.

Example 4-5

A separator was produced in the same manner as in Example 4-1, except that during the preparation of the resin solution, the mass ratio among the alumina particles having an average particle size of 0.5 μm, the boehmite particles having an average particle size of 6.0 μm, and the polyvinylidene fluoride was changed to 72:18:10, and the paint was coated on one face of the substrate by adjusting the coating amount so that the density of the convexities was 900 (per mm$^2$) Further, using this separator, a cylindrical battery was fabricated in the same manner as in Example 1-2.

Example 4-6

A separator was produced in the same manner as in Example 4-1, except that during the preparation of the resin solution, the mass ratio among the alumina particles having an average particle size of 0.5 μm, the boehmite particles having an average particle size of 6.0 μm, and the polyvinylidene fluoride was changed to 45:45:10, and the paint was coated on one face of the substrate by adjusting the coating amount so that the density of the convexities was 1,300 (per mm$^2$) Further, using this separator, a cylindrical battery was fabricated in the same manner as in Example 1-2.

Example 4-7

A separator was produced in the same manner as in Example 4-1, except that during the preparation of the resin solution, the mass ratio among the alumina particles having an average particle size of 0.5 μm, the boehmite particles having an average particle size of 6.0 μm, and the polyvinylidene fluoride was changed to 27:63:10, and the paint was coated on one face of the substrate by adjusting the coating amount so that the density of the convexities was 2,800 (per mm$^2$) Further, using this separator, a cylindrical battery was fabricated in the same manner as in Example 1-2.

Example 4-8

A separator was produced in the same manner as in Example 4-1, except that during the preparation of the resin solution, boehmite particles having an average particle size of 9.5 μm were used instead of boehmite particles having an average particle size of 6.0 μm, the mass ratio among the alumina particles having an average particle size of 0.5 μm, the boehmite particles having an average particle size of 9.5 μm, and the polyvinylidene fluoride was changed to 85:5:10, and the paint was coated on one face of the substrate by adjusting the coating amount so that the density of the convexities was 100 (per mm$^2$) Further, using this separator, a cylindrical battery was fabricated in the same manner as in Example 1-2.

Example 4-9

A separator was produced in the same manner as in Example 4-1, except that during the preparation of the resin solution, the mass ratio among the alumina particles having an average particle size of 0.5 µm, the boehmite particles having an average particle size of 6.0 µm, and the polyvinylidene fluoride was changed to 18:72:10, and the paint was coated on one face of the substrate by adjusting the coating amount so that the density of the convexities was 4,000 (per mm$^2$) Further, using this separator, a cylindrical battery was fabricated in the same manner as in Example 1-2.

Example 4-10

A separator was produced in the same manner as in Example 4-1, except that during the preparation of the resin solution, the mass ratio among the alumina particles having an average particle size of 0.5 µm, the boehmite particles having an average particle size of 6.0 µm, and the polyvinylidene fluoride was changed to 9:81:10, and the paint (resin solution) was coated on one face of the substrate by adjusting the coating amount so that the density of the convexities was 5,000 (per mm$^2$) Further, using this separator, a cylindrical battery was fabricated in the same manner as in Example 1-2.
(Evaluation)

Examples 4-1 to 4-10 were subjected in the following manner to "measurement of thickness of surface layer formed by second particles", "evaluation of spacer function", "measurement of convexity density", "evaluation of concavity interval", and "confirmation of foil tear".
(Measurement of Thickness of Surface Layer Formed by Second Particles)

The thickness of the surface layer formed by second particles was measured in the same manner as described above.
(Measurement of Surface Layer Thickness)

The thickness of the surface layer was measured in the same manner as described above.
(Evaluation of Spacer Function)

The functioning of the first particles as a spacer refers to a situation in which the particle height of the first particles is reflected in the measurement (film thickness measurement) of the thickness of the surface layer. Namely, a situation in which the particle height of the first particles is almost the same as the thickness of the surface layer.

The particle height of the first particles and the thickness of the surface layer were measured in the following manner. When the particle height of the first particles is indicated as the thickness of the surface layer as measured with a film thickness meter, such a case was evaluated as spacer function of the first particles being exhibited (circle), and when the particle height of the first particles is not indicated as the thickness of the surface layer as measured with a film thickness meter, such a case was evaluated as spacer function of the first particles not being exhibited (triangle).

The thickness of the surface layer 3 was measured under compression of 1.8 kg/cm$^2$ using a film thickness meter (manufactured by Mitutoyo). The particle height of the first particles was determined by, when a cross-section of the separator was observed with an SEM, in the thickness direction of the surface layer, drawing a line perpendicular to the thickness direction that passes through the lowest position and a line perpendicular to the thickness direction that passes through the highest position of the image of the first particles, and measuring the length in the thickness direction between these two parallel lines. This was carried out for concavities at predetermined locations, and the average particle height was taken as the measurement value.
(Measurement of Convexity Density)

Surface concavities and convexities were measured using a laser microscope (Trade name: VK-9500, manufactured by Keyence Corporation). The measured range was 210 µm×280 µm. The number of concavities was counted from the measured concavity and convexity results, and calculated as a number per square millimeter. Here, it is not necessary for the convexities to be formed from first particles alone. Convexities formed from a plurality of first particles were also calculated as one convexity. It is noted that FIGS. 16A to 16C (FIG. 16 showing FIGS. 16A to 16C in color is submitted with the written submission of evidence of this application) illustrate the observation results of the surface layers of Examples 4-1 to 4-9 obtained using the laser microscope.
(Measurement of Concavity Interval)

Surface concavities and convexities were measured using a laser microscope (Trade name: VK-9500, manufactured by Keyence Corporation). During this operation, the measured range was 210 µm×280 µm. Cases in which a circular area with a diameter of 30 µm or more was present were evaluated as a "circle", and cases in which such a circular area was not present were evaluated as a "cross".
(Evaluation of Foil Tear)

The cylindrical batteries from each of the examples and comparative examples were charged at a constant current until the battery voltage reached 4.2 V at a charging current of 0.5 C. The batteries were then charged at a constant voltage at a battery voltage of 4.2 V. The charging was stopped when the charging current reached 50 mA. The cylindrical batteries were then disassembled, and the presence of electrode tear was visually confirmed. The above process was carried out on 10 samples of each of the examples, and tear suppression effects were evaluated based on the following criteria.
Of the 10 samples, no foil tear occurred in any of the 10 samples Double circle
Of the 10 samples, foil tear occurred in from 1 to 9 of the 10 samples Circle
Of the 10 samples, foil tear occurred in all 10 of the 10 samples Cross The evaluation results for Examples 4-1 to 4-10 are shown in Table 3.

TABLE 3

|  | Average Particle Size of First Particles (µm) | Thickness of Surface Layer Formed by Second Particles (µm) | Thickness of Surface Layer (µm) | Spacer Function | Convexity Density (per mm$^2$) | Concavity Interval | Foil Tear |
|---|---|---|---|---|---|---|---|
| Example 4-1 | 6.0 | 2.8 | 3.0 | Δ | 100 | ○ | ○ |
| Example 4-2 | 6.0 | 2.7 | 4.0 | Δ | 200 | ○ | ○ |
| Example 4-3 | 6.0 | 2.3 | 5.0 | ○ | 300 | ○ | ◎ |
| Example 4-4 | 6.0 | 2.0 | 5.0 | ○ | 700 | ○ | ◎ |
| Example 4-5 | 6.0 | 2.0 | 5.0 | ○ | 900 | ○ | ◎ |
| Example 4-6 | 6.0 | 1.8 | 5.0 | ○ | 1300 | ○ | ◎ |

TABLE 3-continued

|  | Average Particle Size of First Particles (μm) | Thickness of Surface Layer Formed by Second Particles (μm) | Thickness of Surface Layer (μm) | Spacer Function | Convexity Density (per mm²) | Concavity Interval | Foil Tear |
|---|---|---|---|---|---|---|---|
| Example 4-7 | 6.0 | 1.5 | 5.0 | ○ | 2800 | ○ | ◎ |
| Example 4-8 | 9.5 | 2.0 | 7.0 | Δ | 100 | ○ | ◎ |
| Example 4-9 | 6.0 | 1.5 | 5.0 | ○ | 4000 | X | ○ |
| Example 4-10 | 6.0 | 1.0 | 5.0 | ○ | 5000 | X | ○ |

As illustrated in FIG. 3, according to Examples 4-1 and 4-2, since the convexity density was low, a spacer function of the first particles was not exhibited, and since the concavity-convexity height difference was also high, the foil tear suppression effect was weak. In Example 4-8, although a spacer function of the first particles was not exhibited because the convexity density was low, since the concavity-convexity height difference was high at 7.0 μm, the foil tear suppression effect was good.

In Examples 4-3 to 4-7, a spacer function of the first particles was exhibited, and since the concavity-convexity height difference was not low and the convexity interval was also wide at 30 μm or more, the foil tear suppression effect was good. In Examples 4-9 and 4-10, since the surface layer 3 interval was less than 30 μm, the effect of suppressing expansion of the negative electrode with the space corresponding to the concavities between the electrode and the separator was weak, so that the foil tear suppression effect was weak.

7. Other Embodiments

The present technology is not limited to the embodiments of the present technology described above. Various modifications or applications are possible as long as they do not depart from the gist of the present technology. For example, the numerical values, structures, shapes, materials, raw materials, production processes and the like mentioned in the above embodiments and examples are merely examples. Other different values, structures, shapes, materials, raw materials, production processes and the like may be used as necessary.

In the secondary battery according to the present technology, the electrochemical equivalent of the negative electrode material capable of intercalating and deintercalating lithium may be greater than the electrochemical equivalent of the positive electrode, so that lithium metal does not precipitate on the negative electrode during charging.

Further, in the secondary battery according to the present technology, although the open circuit voltage (i.e., the battery voltage) in a completely charged state per pair of the positive electrode and the negative electrode may be 4.20 V or less, this open circuit voltage may also be designed to be higher than 4.20 V, and is preferably designed to be in the range of 4.25 V or more to 4.50 V or less. By setting the battery voltage to be more than 4.20 V, the discharge amount per unit mass of lithium is greater than for a battery in which the open circuit voltage when completely charged is 4.20 V, even for the same positive electrode active material. Therefore, the amount of the positive electrode active material and the negative electrode active material is adjusted based on this. Consequently, a higher energy density can be obtained.

It is noted that the following background art exists relating to the separator according to the present technology. For example, JP 2010-244875A proposes a technology that, although it is not directed to expansion absorption, forms an uneven shape formed by particles on a separator. Although it is reported that this technology enables an improvement in winding core removability by reducing friction, there are no descriptions about expansion absorption. Further, this technology does not use particles having different particle sizes, and at high surface roughness Sa (three-dimensional surface roughness) values, dropping out of the particles is a problem. In addition, just securing a high Sa value like that shown in Comparative Example 2-1 of Table 1 is meaningless in terms of the expansion absorption that the present technology is directed to.

For example, JP 2009-238752A proposes a technology that enables low-temperature properties to be improved by providing a ceramic porous film having a roughened surface with a center line average roughness (Ra) value of 0.3 μm or more to 1.5 μm or less based on the gravure coating conditions. However, just roughening the surface to within the range of Ra obtained by the improvement in this technology is meaningless in terms of the effect of absorbing expansion of the negative electrode according to the present technology.

For example, JP 2010-123383 proposes a technology that enables the filling density of an inorganic filler to be increased, and piercing strength and heat resistance to be improved by providing on the substrate a porous film formed from an inorganic filler whose particle size has a maximum value in the particle size distribution in each of the range of 0.01 μm or more to 0.05 μm or less and the range of 0.1 μm or more to 1.0 μm or less. However, although this technology is similar in using particles having two different particle sizes, the size of the large particles in this technology is comparatively small. Further, this technology does not confer an uneven structure, conversely it increases the filling density.

Additionally, the present technology may also be configured as below.

(1)
A separator including:
a substrate layer that is porous; and
a surface layer that is provided on at least one main face of the substrate layer and that has an uneven shape,
wherein the surface layer includes
first particles that are for forming convexities of the uneven shape and that are a main component of the convexities,
second particles that have a smaller average particle size than the first particles, cover at least a part of a surface of the first particles, and cover at least a part of a surface of the substrate layer that is exposed between the first particles, and
a resin material.

(2)
The separator according to (1), wherein the first particles function as a spacer and have a height that is substantially same as a thickness of the surface layer.

(3)
The separator according to (1) or (2), wherein a height difference of the uneven shape is 2 µm or more.
(4)
The separator according to any one of (1) to (3), wherein the first particles have an average particle size of 3.5 µm or more.
(5)
The separator according to any one of (1) to (4), wherein a convexity density is 300 per mm$^2$ or more to 2,800 per mm$^2$ or less.
(6)
The separator according to any one of (1) to (5), wherein a thickness of a layer covered by a surface of the substrate layer formed by the second particles is 1.5 µm or more to 3.0 µm or less.
(7)
The separator according to any one of (1) to (6), wherein the second particles have an average particle size of 0.1 µm or more to 1.0 µm or less.
(8)
The separator according to any one of (1) to (7), wherein the first particles and the second particles are electrically insulating particles.
(9)
The separator according to any one of (1) to (8), wherein the resin material is a resin including a fluororesin.
(10)
The separator according to any one of (1) to (9), wherein the second particles covering the surface of the substrate layer confer oxidation resistance to the substrate layer.
(11)
The separator according to any one of (1) to (10), wherein the substrate layer is a resin film that is porous.
(12)
A nonaqueous electrolyte battery including:
a separator;
an electrode body including a positive electrode and a negative electrode that oppose each other with the separator provided therebetween; and
a nonaqueous electrolyte,
wherein the separator includes
a substrate layer that is porous, and
a surface layer that is provided on at least one main face of the substrate layer and that has an uneven shape, and
wherein the surface layer includes
first particles that are for forming convexities of the uneven shape and that are a main component of the convexities,
second particles that have a smaller average particle size than the first particles, cover at least a part of a surface of the first particles, and cover at least a part of a surface of the substrate layer that is exposed between the first particles, and
a resin material.
(13)
The nonaqueous electrolyte battery according to (12), wherein the negative electrode includes as a negative electrode active material an alloy-based negative electrode material having as a constituent element at least one kind of element selected from among metal elements and semimetal elements that are capable of forming an alloy with lithium.
(14)
The nonaqueous electrolyte battery according to (13), wherein the alloy-based negative electrode material includes tin as the constituent element.
(15)
A battery pack including:
the nonaqueous electrolyte battery according to (12);
a controller configured to control the nonaqueous electrolyte battery; and
a package configured to house the nonaqueous electrolyte battery.
(16)
An electronic device including:
the nonaqueous electrolyte battery according to (12),
wherein the electronic device receives a supply of power from the nonaqueous electrolyte battery.
(17)
An electric vehicle including:
the nonaqueous electrolyte battery according to (12);
a conversion device configured to receive a supply of power from the nonaqueous electrolyte battery and convert the received power into a vehicle drive force; and
a control device configured to perform information processing relating to vehicle control based on information regarding the nonaqueous electrolyte battery.
(18)
A power storage device including:
the nonaqueous electrolyte battery according to (12),
wherein the power storage device is configured to supply power to an electronic device connected to the nonaqueous electrolyte battery.
(19)
The power storage device according to (18), including:
a power information control device configured to exchange signals with another device via a network,
wherein the power storage device is configured to perform charging and discharging control of the nonaqueous electrolyte battery based on information received by the power information control device.
(20)
A power system configured to receive a supply of power from the nonaqueous electrolyte battery according to (12), or to supply power to the nonaqueous electrolyte battery from a power generation device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 2 substrate
3 surface layer
4a first particles
4b second particles
10 nonaqueous electrolyte battery
11 battery can
12a, 12b insulating plate
13 battery cap
14 safety valve mechanism
14a convexities
15 disc holder 15
16 cutting-off disc
16a opening
17 positive temperature coefficient element
18 gasket
19 sub disc 20 wound electrode body
21 positive electrode
21A positive electrode current collector
21B positive electrode active material layer
24 negative electrode
22A negative electrode current collector
22B negative electrode active material layer
24 center pin
25 positive electrode lead
26 negative electrode lead
30 nonaqueous electrolyte battery
31 battery can
32 battery cap
33 electrode pin
34 insulating body
35 through-hole
36 internal pressure release mechanism
36a first aperture grooves
36b second aperture grooves
37 electrolyte solution injection port
38 sealing member
40 wound electrode body
41 positive electrode terminal
50 wound electrode body
51 positive electrode lead
52 negative electrode lead
53 positive electrode
53A positive electrode current collector
53B positive electrode active material layer
54 negative electrode
54A negative electrode current collector
54B negative electrode active material layer
56 gel electrolyte
57 protective tape
58 separator
60 package member
61 contact film
62 nonaqueous electrolyte battery
70 laminated electrode body
71 positive electrode lead
72 negative electrode lead
73 positive electrode
74 negative electrode
76 fixing member
301 assembled battery
301a secondary battery
302 charge control switch
302a charge control switch
302b diode
303a discharge control switch
303b diode
304 switch part
307 current sensing resistor
308 temperature sensing element
310 controller
311 voltage sensing part
313 current measuring part
314 switch controller
317 memory
318 temperature sensing part
321 positive electrode terminal
322 negative electrode terminal
400 power storage system
401 house
402 concentrated power system
402a thermal power generation
402b nuclear power generation 402c hydroelectric power generation
403 power storage device
404 power generation device
405 power consumption device
405a refrigerator
405b air conditioner
405c television receiver
405d bath
406 electric vehicle
406a electric car
406b hybrid car
406c motorcycle
407 smart meter
408 power hub
409 power network
410 control device
411 sensor
412 information network
413 server
500 hybrid car
501 engine
502 power generator
503 driving power conversion device
504a driving wheel
504b driving wheel
505a wheel
505b wheel
508 battery
509 vehicle control device
510 various sensors
511 charging inlet

The invention claimed is:

1. A separator comprising:
a substrate layer that is porous; and
a surface layer that is provided on at least one main face of the substrate layer and that has an uneven shape,
wherein the surface layer includes
first particles forming convexities of the uneven shape, the first particles are a main component of the convexities,
second particles that have a smaller average particle size than the first particles, cover at least a part of a surface of the first particles, and cover at least a part of a surface of the substrate layer that is exposed between the first particles,
the first and second particles comprise inorganic particles, and
a resin material including a fluororesin,
wherein a mass ratio of the second particles to the first particles is 27:63 to 89:1.

2. The separator according to claim 1, wherein the first particles function as a spacer and have a height that is substantially same as a thickness of the surface layer.

3. The separator according to claim 2, wherein a height difference of the uneven shape is 2 µm or more.

4. The separator according to claim 3, wherein the first particles have an average particle size of 3.5 µm or more.

5. The separator according to claim 4, wherein a convexity density is 300 per mm2 or more to 2,800 per mm$^2$ or less.

6. The separator according to claim 3, wherein a thickness of a layer covered by a surface of the substrate layer formed by the second particles is 1.5 µm or more to 3.0 µm or less.

7. The separator according to claim 3, wherein the second particles have an average particle size of 0.1 µm or more to 1.0 µm or less.

8. The separator according to claim 1, wherein the first particles and the second particles are electrically insulating particles.

9. The separator according to claim 1, wherein the substrate layer is a resin film that is porous.

10. A nonaqueous electrolyte battery comprising:
the separator of claim 1;
an electrode body including a positive electrode and a negative electrode that oppose each other with the separator provided therebetween; and
a nonaqueous electrolyte.

11. The nonaqueous electrolyte battery according to claim 10, wherein the negative electrode includes as a negative electrode active material an alloy-based negative electrode material having as a constituent element at least one kind of element selected from among metal elements and semimetal elements that are capable of forming an alloy with lithium.

12. The nonaqueous electrolyte battery according to claim 11, wherein the alloy-based negative electrode material includes tin as the constituent element.

13. A battery pack comprising:
the nonaqueous electrolyte battery according to claim 10;
a controller configured to control the nonaqueous electrolyte battery; and
a package configured to house the nonaqueous electrolyte battery.

14. An electronic device comprising:
the nonaqueous electrolyte battery according to claim 10, wherein the electronic device receives a supply of power from the nonaqueous electrolyte battery.

15. An electric vehicle comprising:
the nonaqueous electrolyte battery according to claim 10;
a conversion device configured to receive a supply of power from the nonaqueous electrolyte battery and convert the received power into a vehicle drive force; and
a control device configured to perform information processing relating to vehicle control based on information regarding the nonaqueous electrolyte battery.

16. A power storage device comprising:
the nonaqueous electrolyte battery according to claim 10, wherein the power storage device is configured to supply power to an electronic device connected to the nonaqueous electrolyte battery.

17. The power storage device according to claim 16, comprising:
a power information control device configured to exchange signals with another device via a network, wherein the power storage device is configured to perform charging and discharging control of the nonaqueous electrolyte battery based on information received by the power information control device.

18. A power system configured to receive a supply of power from the nonaqueous electrolyte battery according to claim 10, or to supply power to the nonaqueous electrolyte battery from a power generation device or a power network.

19. The separator according to claim 1, wherein the first and second particles comprise an aluminosilicate selected from the group consisting of layered silicates, barium titanate, strontium titanate, and combinations thereof.

20. The separator according to claim 1, wherein the first and second particles comprise organic particles comprising resins having a melting point or a glass transition temperature of at least 180° C.

21. The separator according to claim 2, wherein the first and second particles further comprise inorganic particles of silicon oxide.

22. The separator according to claim 1, wherein the second particles are primary particles or secondary particles agglomerated from the primary particles.

23. The separator according to claim 1, wherein the second particles cover the surface of the substrate and form a base layer that acts as a base of the first particles, and the first particles are arranged so that some of the first particles are embedded in the base layer.

24. The separator according to claim 1, wherein a thickness of the surface layer is 3.0 μm or more to 8.0 μm or less.

25. The separator according to claim 1, wherein a surface roughness of the surface layer is 0.60 μm or more to 0.70 μm or less.

26. The separator according to claim 1, wherein one or both of a contraction ratio in MD direction is 24% or more to 38% or less, and a contraction ratio in TD direction is 21% or more and 32% or less.

27. The separator according to claim 1, wherein the mass ratio among the second particles and the first particles is 27:63 to 81:9.

28. The separator according to claim 1, wherein the first and second particles have shapes selected from the group consisting of spherical, plate-shaped, fibrous, cubic, and combinations thereof.

29. The separator according to claim 1, wherein the first particles are boehmite and the second particles are alumina.

30. The separator according to claim 1, wherein the fluororesin is polyvinylidene fluoride.

31. The separator according to claim 1, wherein a surface porosity of the surface layer is 80.7% or more to 84.5% or less.

* * * * *